June 26, 1951 — J. D. GOW — 2,558,485

CABLE TESTING SYSTEM AND METHOD

Filed Feb. 27, 1945 — 9 Sheets-Sheet 1

INVENTOR.
JAMES D. GOW
BY
ATTORNEY.

June 26, 1951  J. D. GOW  2,558,485
CABLE TESTING SYSTEM AND METHOD
Filed Feb. 27, 1945  9 Sheets-Sheet 4
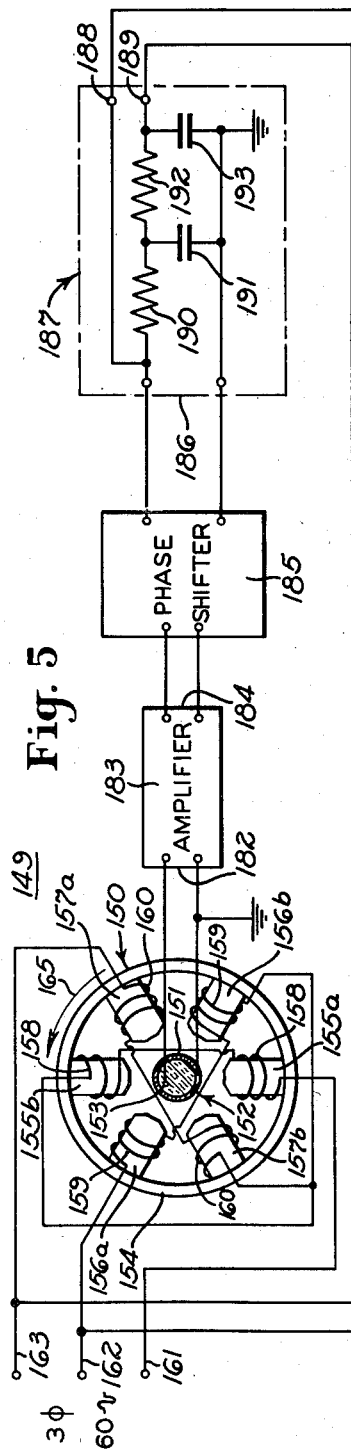
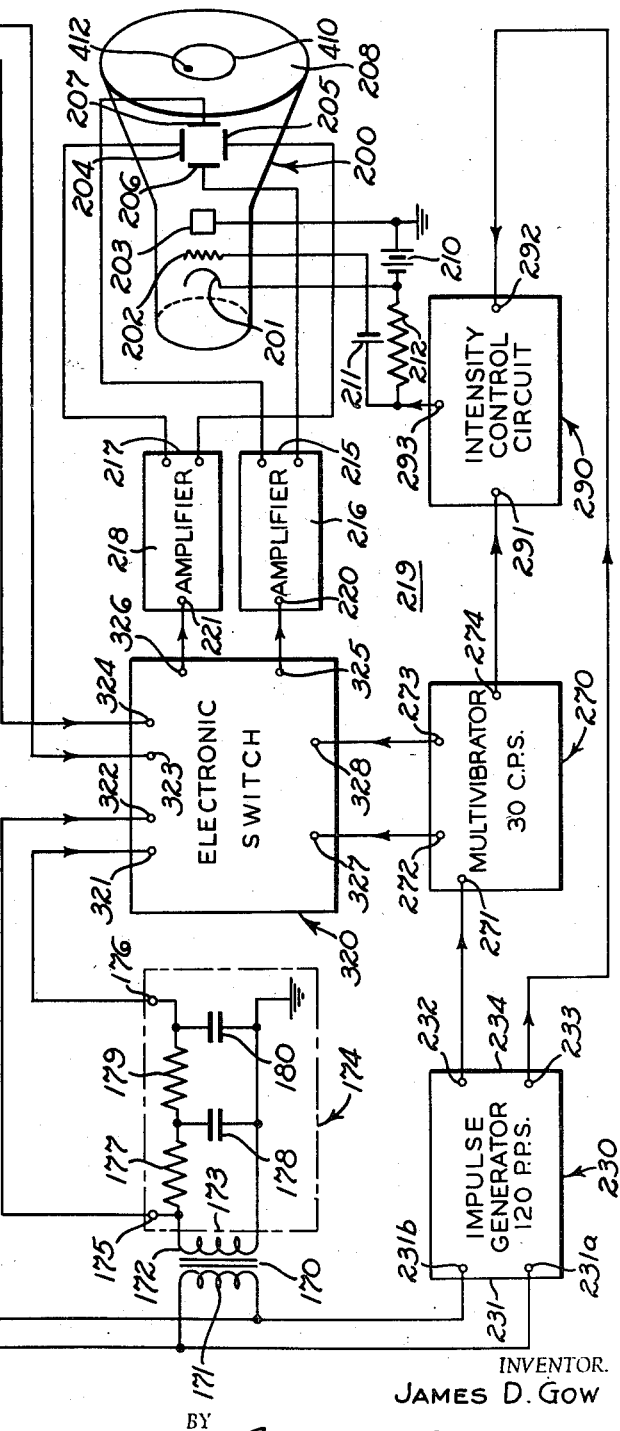
Fig. 5
INVENTOR.
JAMES D. GOW
BY
ATTORNEY.

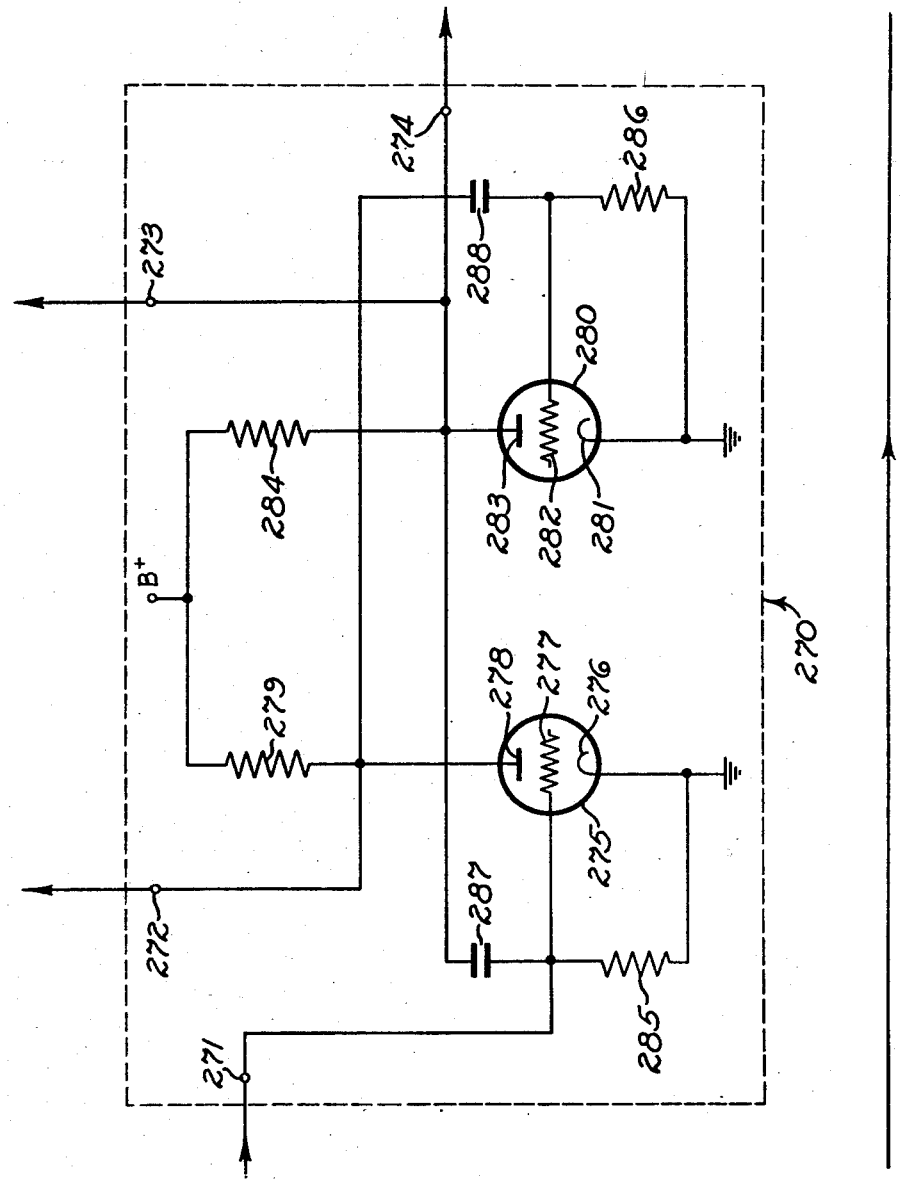

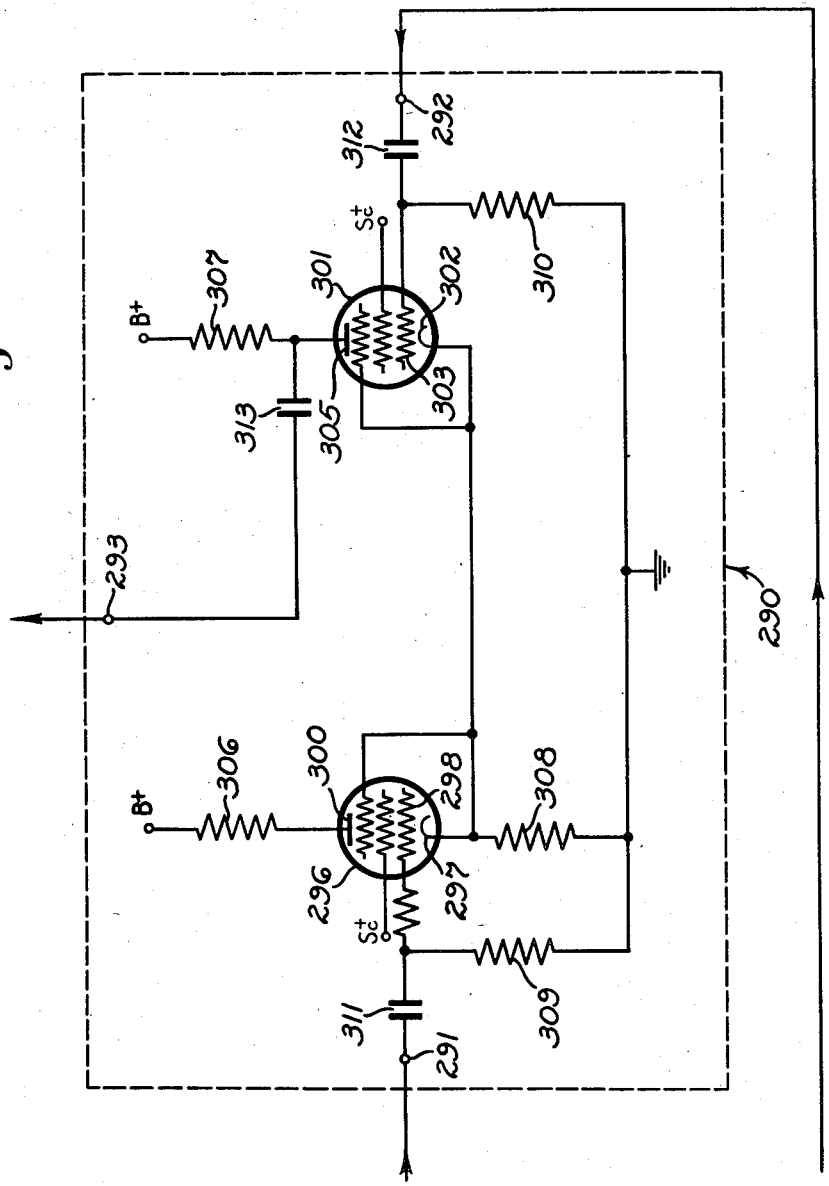

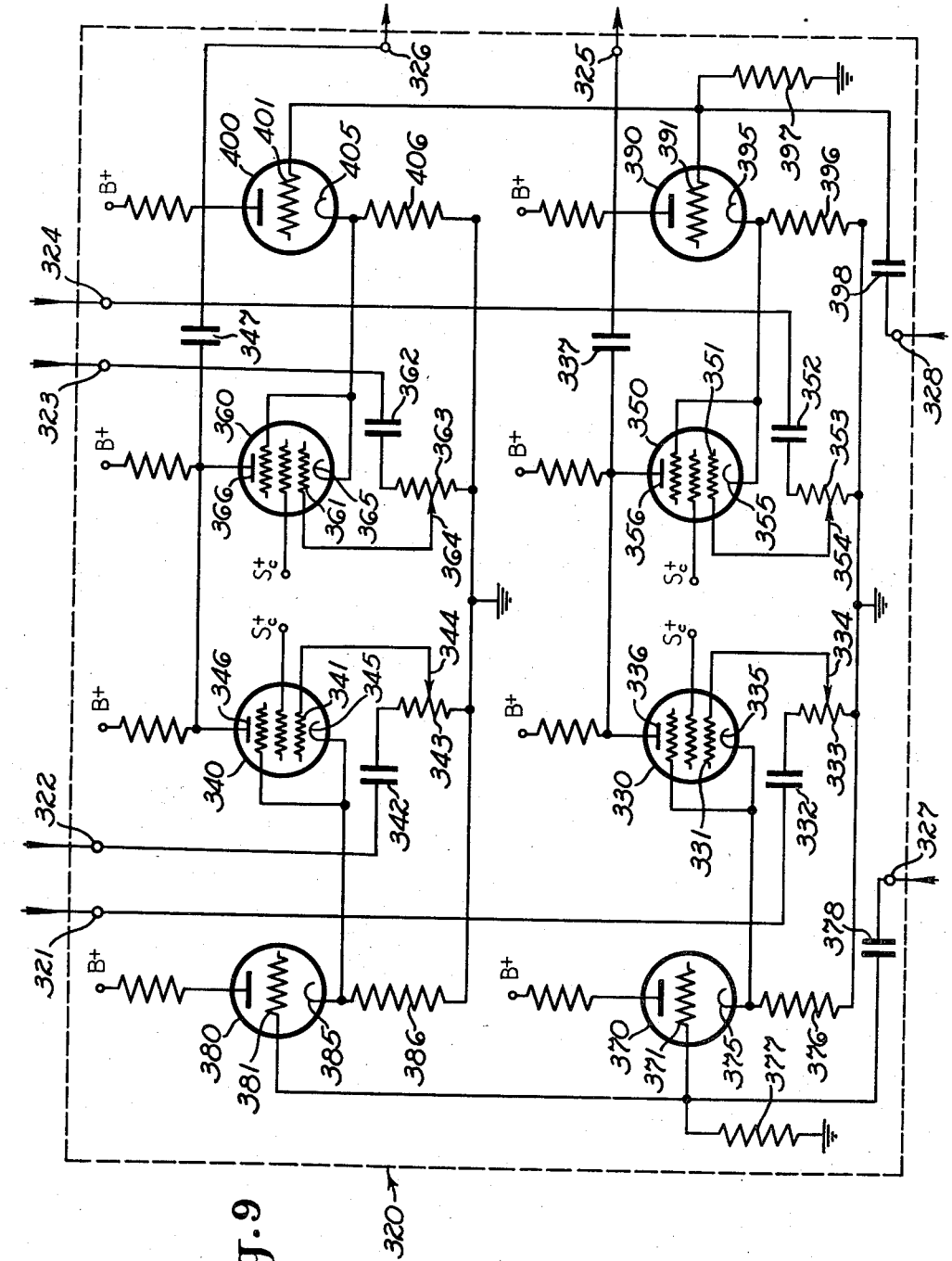

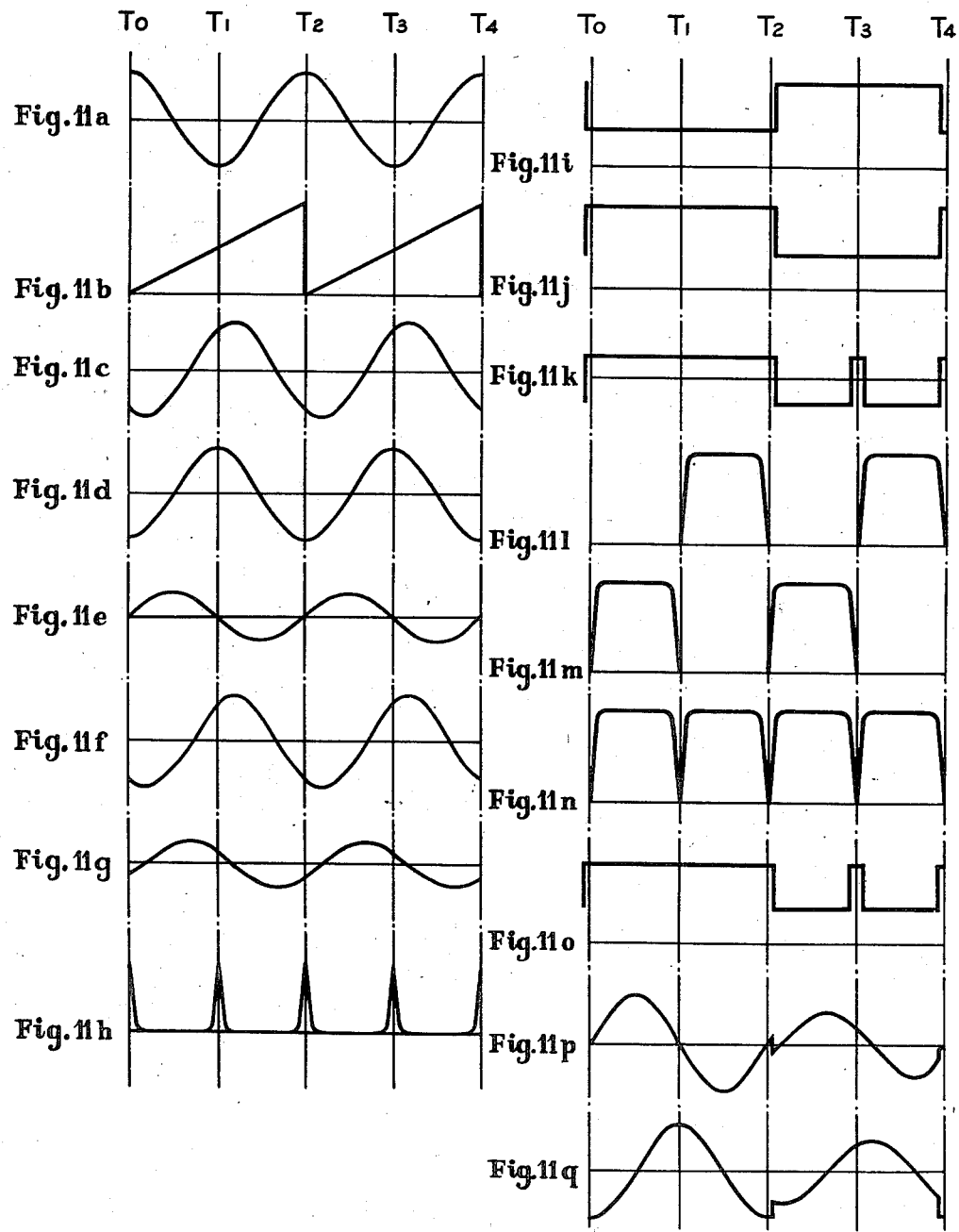

Patented June 26, 1951

2,558,485

UNITED STATES PATENT OFFICE 2,558,485

CABLE TESTING SYSTEM AND METHOD

James D. Gow, San Francisco, Calif., assignor to the United States of America as represented by the United States Atomic Energy Commission Application February 27, 1945, Serial No. 580,046

44 Claims. (Cl. 175—183)

The present invention relates to the testing of cables and the like and more particularly to improved methods and apparatus for determining the relative position of conductors in opaque cables.

An object of the invention is to provide an improved method for determining the position of a conductor or other filamentary element in an elongated opaque body in which it is supported.

Another object of the invention is to provide apparatus for determining the position of a conductor or other filamentary element in an opaque body relative to a predetermined axis therein.

Another object of the invention is to provide an improved apparatus for determining the eccentricity of a coaxial cable, both as to the distance between the axes of the outer and inner conductors and as to the direction of the displacement between these axes.

Another object of the invention is to provide an arrangement for visually indicating the position of the inner conductor of a coaxial cable with respect to the outer conductor.

Another object of the invention is to provide a system for measuring the eccentricity of the inner conductor of a coaxial cable with respect to the cable sheath including an eccentricity testing device in which the accuracy of measuring the eccentricity does not depend on accurately centering the coaxial cable in the testing device.

Another object of the invention is to provide a testing device for determining the eccentricity of any desired section of a coaxial cable without the necessity of feeding the cable into the testing device from the end of the cable.

Another object of the invention is to provide a testing device adapted to measure and indicate the position of an inner conductor of a coaxial cable with respect to the cable sheath with a feeding mechanism for automatically feeding the cable therethrough to facilitate determining variations in such position along the length of the cable.

Another object of the invention is to provide apparatus for automatically feeding a coaxial cable through an eccentricity testing device and for indicating the sections of the cable in which the position of the inner conductor with respect to the cable sheath lies outside of a predetermined range.

Another object of the invention is to provide apparatus for automatically feeding a coaxial cable through an eccentricity testing device, an arrangement for arresting the automatic feeding of the cable through the testing device when a section of the cable in which an inner conductor has an eccentricity outside of a predetermined range with respect to the cable sheath enters the testing region.

Another object of the invention is to provide apparatus for facilitating the marking of different sections of a coaxial cable in accordance with the eccentricity of the inner conductor thereof with respect to the cable sheath in those sections or in accordance with some mechanical or electrical property of the cable dependent upon such eccentricity and affecting the manner or the range of use of the cable.

The invention together with the foregoing and other objects and advantages thereof may be more readily understood by reference to the following description taken in conjunction with the accompanying drawings, wherein Figure 1 is a diagrammatic end view of a testing device embodying features of the present invention, and including a rotating magnetic field generator;

Fig. 5 is a schematic wiring diagram illustrating an embodiment of the invention including a control network for presenting a cross sectional view of a coaxial cable on the screen of a cathode ray tube;

Fig. 7 is a schematic wiring diagram of the multivibrator of the control network of Fig. 5;

Fig. 8 is a schematic wiring diagram of the cathode ray intensity control circuit of the control network of Fig. 5;

Fig. 9 is a schematic wiring diagram of the electronic switch of the control network of Fig. 5;

Fig. 10 illustrates the mode of combining Figs. 6, 7, 8, and 9 to form a unified control network incorporated in Fig. 5; and Figs. 11a to 11q are a series of coordinated graphs indicating how the electromotive forces and other related factors appearing at various points in the circuit of Fig. 5 vary as a function of time in a cycle of operation.

Figure 1:
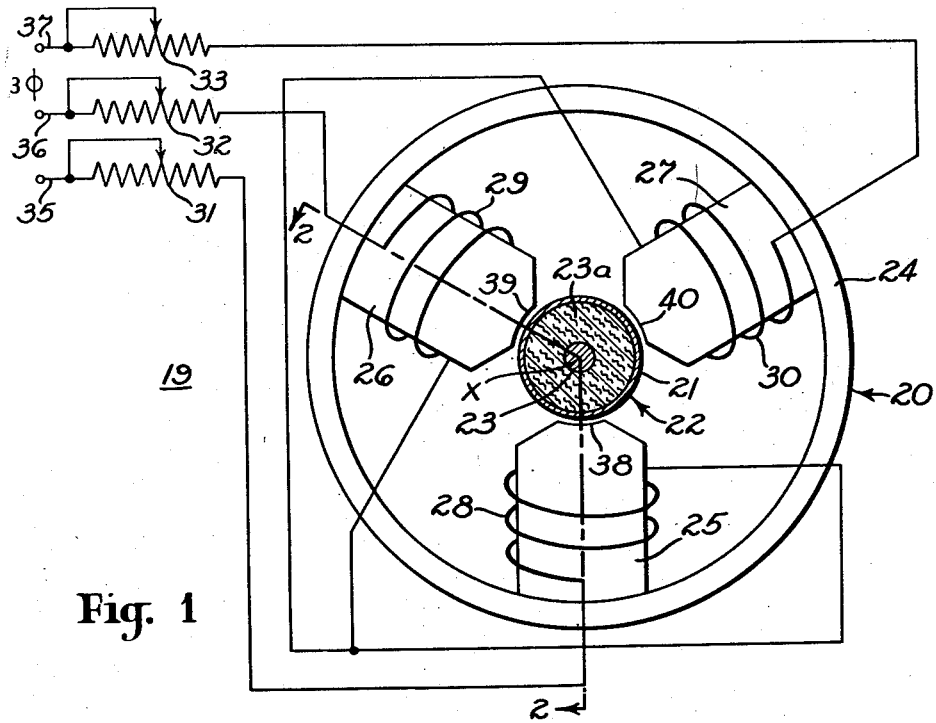
Figure 2:
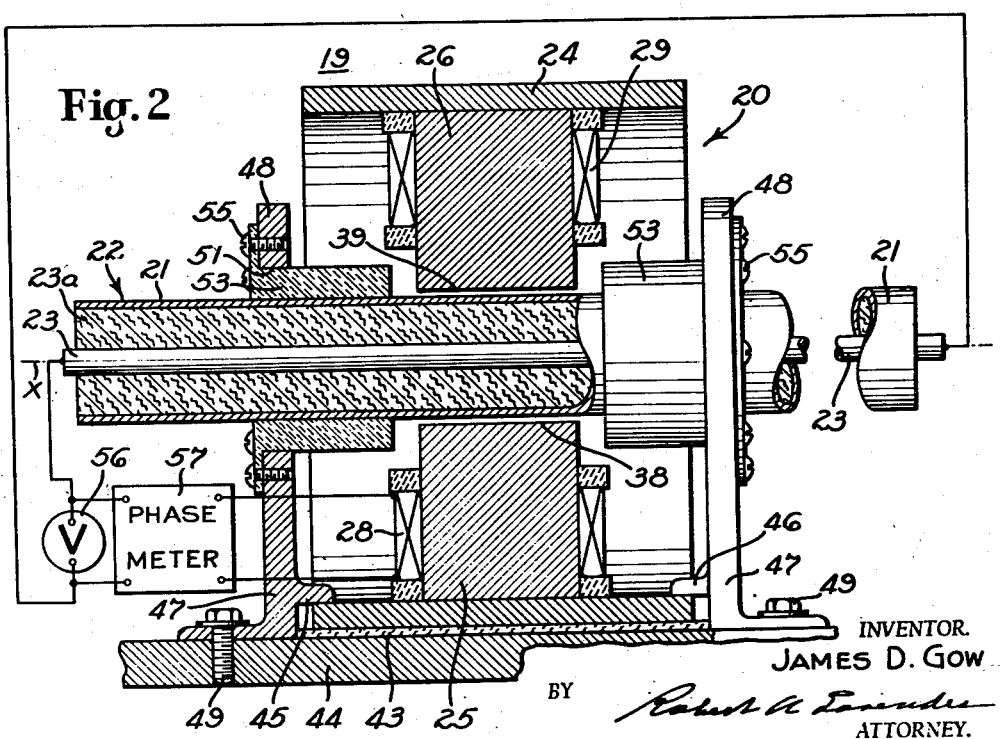
Fig. 2 is a diagrammatic sectional view taken on the line 2—2 of Fig. 1 illustrating one system using the magnetic field generator in practicing the invention.

Referring to Figs. 1 and 2, there is illustrated one form of cable testing device 19 for measuring the degree of eccentricity of a coaxial cable. This device 19 includes a rotating magnetic field generator 20 having a circular magnetic yoke 24 provided with three poles 25, 26, and 27 extending radially inward toward the axis of the yoke 24 and having three field coils 28, 29, and 30 positioned on the three poles 25, 26, and 27 respectively. The three field coils 28, 29, and 30 are star-connected to a three phase source of alternating current power, the inner ends of the three coils being connected together and the outer ends of the respective coils 28, 29, and 30 being connected through corresponding current controlling resistors 31, 32, and 33 to the three conductors 35, 36, and 37 of a three phase power line. The yoke 24 and the three poles 25, 26, and 27 are symmetrically arranged about the central axis X of the magnetic field generator 20, the center of the yoke 24 coinciding with the central axis X and the poles 25, 26, and 27 being uniformly spaced about the inner circumference of the yoke 24. The inner tips 38, 39, and 40 of the poles 25, 26, and 27 define a test region in which a cable 22, comprising an outer conductor, or metallic sheath, 21, an inner conductor 23, and insulation 23a, to be tested is placed. These pole tips 38, 39, and 40 are so arranged that when current is supplied to the field coils 28, 29, and 30 from different phases of the three phase power source, a rotating magnetic field is produced in the test region between the pole tips.

The circular yoke 24 rests on a sheet 43 of somewhat compressible material on a base member 44 and is clamped securely to the base member 44 by means of bolts 49 cooperating with horizontally extending arms 45 and 46 adjacent the lower end of two brackets 47, 47. The two brackets 47, 47 carry two corresponding upright arms 48, 48 extending over opposite ends of the magnetic field generator 20, the two arms 48, 48 being provided with two corresponding circular openings 51, 51 therethrough in coaxial alignment with the central axis X of the magnetic field generator 20. Two similar flanged tubular guide members 53, 53 of the same size and shape extend through the openings 51 in the upright arms 48, 48 and are rigidly secured thereto by means of bolts 55, the central openings in the guide members being in coaxial alignment with the central axis X of the magnetic field generator 20. The tubular guide members 53 serve to support the coaxial cable 22 in the test region between the tips 38, 39, and 40 of the salient poles 25, 26, and 27 with the axis of the sheath 21 of the coaxial cable 22 substantially in coincidence with the axis X of rotation of the magnetic field. An alternating current voltmeter 56 is connected across opposite ends of the inner conductor 23 of the coaxial cable 22. A phasemeter 57 is provided having two sets of input terminals, one set being connected across the field coil 28 and the other set being connected across the voltmeter 56, that is, to opposite ends of the conductor 23. The phasemeter 57 indicates the phase angle difference between the alternating electromotive force across the coil 28 and the alternating electromotive force induced in the inner conductor 23 of the coaxial cable 22.

In operation, when three phase alternating current is supplied to the field windings 28, 29, and 30, a rotating magnetic field is produced in the test region between the tips 38, 39, and 40 of the salient poles 25, 26, and 27. The magnetic flux passes radially through the salient poles and circumferentially through the yoke 24 forming continuous paths through the test region, the poles 25, 26, and 27, and the yoke 24. The angle of rotation of the magnetic field with respect to a vertical line varies in synchronism with the phase angle of the electromotive force across the field coil 28. As the magnetic field rotates about the predetermined axis X of rotation at the center of the magnetic field generator 20, an electromotive force is induced along the length of the inner conductor 23 of the coaxial cable 22 in an amount bearing a direct relation to the distance between the axis of the inner conductor 23 and the axis X of rotation. Thus, when the axis of the inner conductor 23 coincides with the axis of the sheath 21 of the coaxial cable 22, the eccentricity of the cable is zero and substantially no electromotive force is indicated by the voltmeter 56. However, when the coaxial cable is eccentric, an alternating electromotive force is indicated by the voltmeter 56 of a magnitude which increases in accordance with distance between the axes of the inner and outer coductors 23 and 21 of the coaxial cable 22, and hence in accordance with the eccentricity of the coaxial cable 22. The direction of the inner conductor 23 from the axis of the sheath is indicated by the reading of the phasemeter 57.

The voltmeter 56 may be calibrated directly in eccentricity by successively positioning in the testing device 19 each of a series of standard coaxial cables of known eccentricity and measuring the corresponding electromotive forces induced along the length of the inner conductors thereof when subjected to the rotating magnetic field. Similarly, the phasemeter 57 may be calibrated directly in angular position by successively positioning in the test device each of a series of standard coaxial cables having inner conductors located in known directions from the cable axis and measuring the corresponding phase angle difference.

Effects due to harmonics arising because of irregularities in the rotating magnetic field may be reduced in a number of ways. In the first place such effects may be reduced by utilizing a voltmeter 56 and a phasemeter 57 of a type which selectively responds to signals of line frequency. This may be accomplished for example when the line frequency is 60 C. P. S. and the field is rotating at 3600 R. P. M. by utilizing a vacuum tube voltmeter 56 and a phasemeter 57 including band pass filters at their inputs which selectively pass voltages in a range including 60 C. P. S. Such effects may also be reduced by utilizing as a field generator 20 a two pole phase wound stator having a suitably distributed winding of the type used in induction motors. For this purpose for example a three phase Selsyn stator has proved particularly adaptable. With either of these arrangements the value of the electromotive force induced in the inner conductor 23 of the coaxial cable 22 is substantially proportional to the distance of the inner conductor from the axis of the field generator and the angular reading of the phasemeter corresponds linearly with the angular position of the inner conductor in the test region.

In view of the foregoing it will be understood that the position of any conductor with respect to a predetermined axis of a body supporting the conductor may be determined by establishing a magnetic field which rotates about that axis and measuring the amplitude and phase of the resultant alternating electromotive force induced in the conductor.

Figure 3:
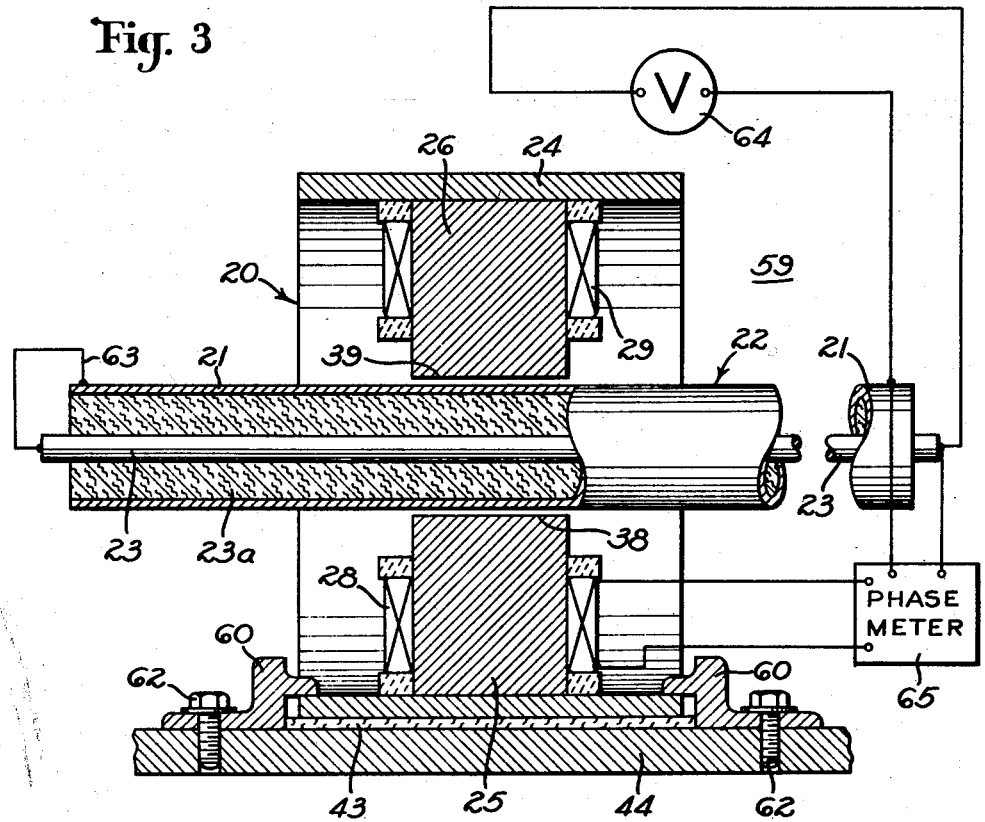
Fig. 3 is a diagrammatic sectional view, similar to Fig. 2, illustrating another system using the magnetic field generator in practicing the invention.

Referring now to Figs. 1 and 3, there is illustrated another cable testing device 59 for measuring the degree of eccentricity of a coaxial cable. The testing device 59 illustrated here is similar to that hereinabove described in connection with Figs. 1 and 2 and comprises the same rotating magnetic field generator 20. In this case also the yoke 24 rests on a sheet 43 of somewhat compressible material on a base member 44, but in this case is clamped securely to the base member 44 by means of two small brackets 60, 60 rigidly secured to the base by means of bolts 62. In this case no special precautions are taken to position the axis of the coaxial cable 22 in coincidence with the axis of rotation of the magnetic field and the coaxial cable 22 to be tested is supported in the test region between the pole tips 38, 39, and 40 with the axis of the coaxial cable 22 disposed substantially parallel to the axis of rotation of the magnetic field, simply by resting the cable 22 on the tip 38 of the lower magnetic pole 25. A short wire 63 electrically connects the outer and inner conductors 21 and 23 together at one end of the coaxial cable 22 and an alternating current voltmeter 64 is connected between the ends of the outer and inner conductors 21 and 23 at the other end of the coaxial cable 22. A phasemeter 65 is provided having two sets of input terminals, one set being connected across the field coil 28 and the other set being connected across the voltmeter 64.

In operation, when three phase alternating current is supplied to the field windings 28, 29, and 30, a magnetic field is produced in the test region between the tips of the salient poles, the magnetic field rotating about a predetermined axis in the manner hereinabove explained. As the magnetic field rotates, an electromotive force is induced along the length of the outer conductor 21 in an amount corresponding to the distance between the axis of the outer conductor 21 and the predetermined axis of rotation, and another electromotive force is induced along the length of the inner conductor 23 in an amount corresponding to the distance between the axis of the inner conductor 23 and the predetermined axis of rotation. Thus, when the axis of the inner conductor 23 coincides with the axis of the outer conductor 21 of the coaxial cable 22, the eccentricity of the coaxial cable 22 is zero and the two electromotive forces induced in the outer and inner conductors 21 and 23, respectively, are equal so that no electromotive force is indicated by the meter 64. However, when the axis of the inner conductor 23 does not coincide with the axis of the outer conductor 21 of the coaxial cable 22, the two alternating electromotive forces induced in the outer and inner conductors 21 and 23, respectively, of the coaxial cable 22 differ by an amount bearing a direct relation to the distance between the axes of the outer and inner conductors 21 and 23, respectively, and thus to the eccentricity of the inner conductor 23 with respect to the cable sheath 21. The phase difference between the alternating electromotive force across the coil 28 and the alternating electromotive force induced in the inner conductor 23 indicated by the phasemeter 65 is a measure of the angular position of the inner conductor 23 with respect to the vertical line passing through the axis of the coaxial cable 22. The voltmeter 64 and the phasemeter 65 may be accurately calibrated by placing each of a series of coaxial cables of known characteristic in the magnetic field and noting the corresponding voltage and phase readings as hereinbefore explained.

Inasmuch as the electromotive force indicated by the alternating current voltmeter 64 depends solely upon the distance between the axes of the outer and inner conductors 21 and 23, the accuracy of measuring the eccentricity of a coaxial cable with this arrangement is not dependent upon centering the coaxial cable 22 in the magnetic field. This arrangement for measuring the eccentricity of a coaxial cable 22 is also less subject to effects caused by irregularities in the magnetic field. Such effects may be reduced if desired in the manner hereinbefore explained.

In view of the foregoing, it will be understood that the relative positions of any two substantially parallel conductors may be determined by establishing a magnetic field which rotates about an axis substantially parallel to the conductors and measuring the amplitude and phase of the resultant difference between the alternating electromotive forces induced in the conductors.

Figure 4:
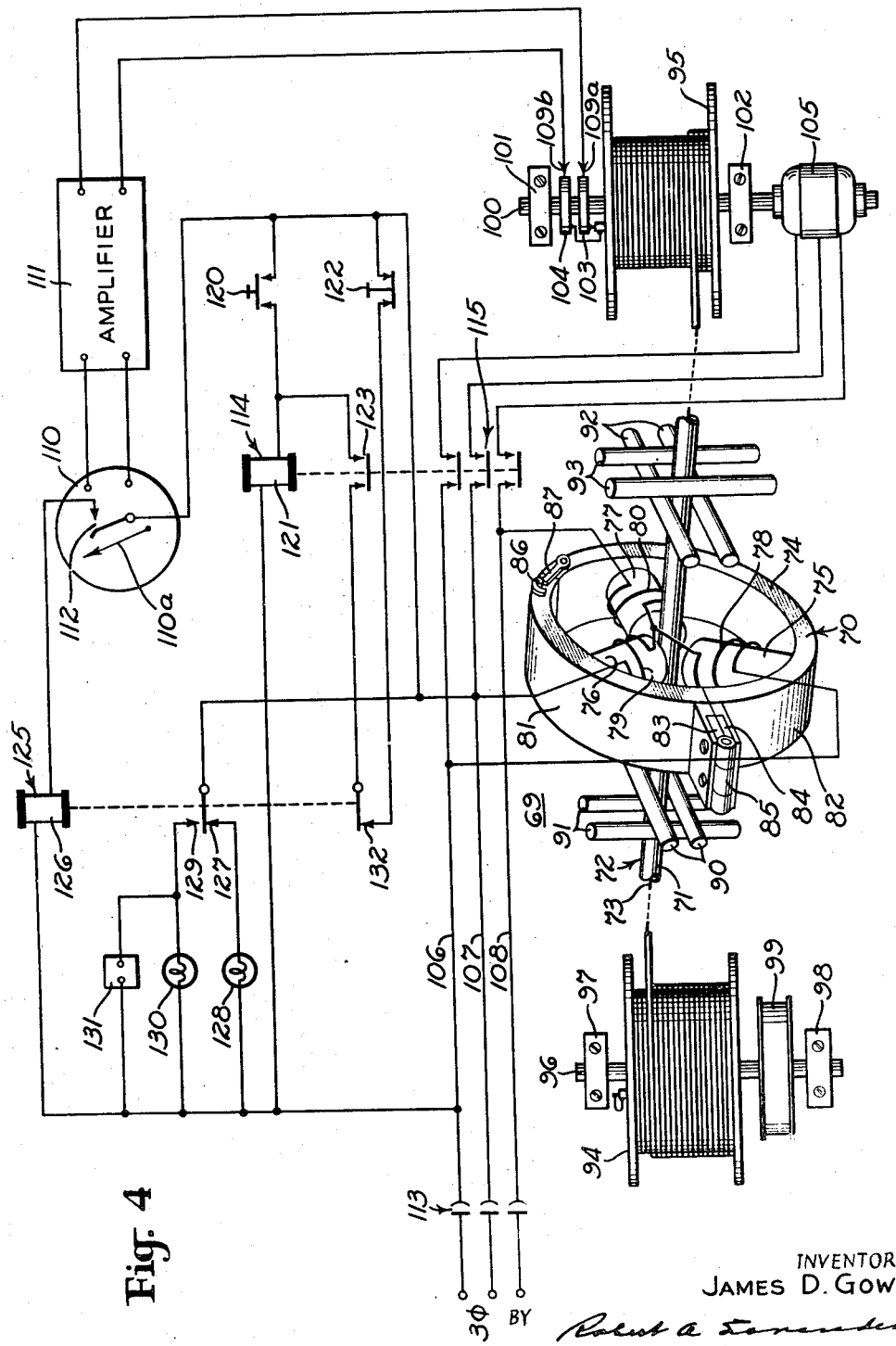
Fig. 4 is a diagrammatic illustration of an embodiment of the invention suitable for successively testing a series of sections of a cable.

Referring now to Fig. 4, there is illustrated a form of cable testing apparatus for measuring variations in the degree of eccentricity of a coaxial cable 72 having outer and inner conductors 71 and 73 from section to section along its length. This apparatus comprises a testing device 69 including a rotating magnetic field generator 70 and an arrangement of roller guides 90, 91, 92, and 93 for positioning a section of the coaxial cable 72 to be tested in the rotating magnetic field with the axis of the coaxial cable 72 disposed along a line substantially parallel to the predetermined axis.

More particularly, the magnetic field generator 70 comprises three salient poles 75, 76, and 77, three corresponding field coils 78, 79, and 80, and a circular yoke 74, constructed generally in the manner hereinabove set forth. The three field coils 78, 79, and 80 are star-connected directly to three buses 106, 107, and 108, respectively, which may be connected to a source of three phase alternating current through a circuit breaker 113. In this magnetic field generator 70 the yoke 74 is formed of first and second arcuate segments 81 and 82 secured respectively to two leaves 83 and 84 of a hinge 85 at one end thereof and normally locked together at the other end thereof by means of a pin 86 on the first segment 81 and a hook 87 pivotally supported on the second segment 82. The first segment 81 extends over a relatively small arc of about 120° and supports one of the poles 76 and the second segment 82 extends over a relatively large arc of about 240° and supports the other poles 75 and 77. When locked in their normal, closed position, the two arcuate segments 81 and 82 constitute a circular yoke interconnecting the poles 75, 76, and 77 providing a closed magnetic circuit at the outer ends thereof. When the two arcuate segments 81 and 82 are unlocked and swung apart to an open position, a section of the cable 72 may be introduced into the test region defined by the tips of the poles 75, 76, and 77 at the center of the magnetic field generator. In operation, the segments 81 and 82 are in their locked position so that when three phase alternating current is supplied to the field coils 78, 79, and 80, a rotating magnetic field is established in the test region between the tips of the poles 75, 76, and 77, the magnetic field rotating about the axis of the magnetic field generator 70 in the manner hereinabove explained. A first pair of horizontal roller guides 90 and a first pair of vertical roller guides 91 are arranged on one side of the magnetic field generator 70, and a second pair of horizontal roller guides 92 and a second pair of vertical roller guides 93 are arranged on the other side of the magnetic field generator 70 to facilitate feeding the coaxial cable 72 through the test region between the poles 75, 76, and 77 along a line substantially parallel to the axis of rotation of the magnetic field.

A cable feeding mechanism is provided including a feed, or pay-out reel 94, and a take-up reel 95. The pay-out reel 94 is mounted on an axle 96 supported at opposite ends by two bearings 97 and 98. A friction brake 99 is mounted on the pay-out reel axle 96. The take-up reel 95 is mounted on an axle 100 supported on opposite sides of the take-up reel 95 by means of bearings 101 and 102. Two insulated slip rings 103 and 104 are mounted on the take-up reel axle 100. Attached to one end of the take-up reel axle 100 is a three phase induction motor 105 preferably of the gear head speed reducing type adapted when suitably energized from the buses 106, 107, and 108 to drive the take-up reel 95 at a suitable testing speed. The two ends of the conductors 71 and 73 of the coaxial cable 72 on the pay-out reel 94 are electrically connected together in any suitable manner and the two ends of the conductors 71 and 73 of the coaxial cable 72 on the take-up reel 95 are electrically connected by suitable means to the two slip rings 103 and 104. Two brushes 109a and 109b contacting the slip rings 103 and 104, respectively, are connected to the input of a voltage amplifier 111.

An adjustable off-normal voltmeter 110 is connected in the output of the voltage amplifier 111 and includes an indicator hand 110a for indicating the voltage appearing in the output of the amplifier 111. The off-normal voltmeter 110 also includes normally open contacts 112 which are closed when the voltage in the output of the amplifier 111 exceeds a predetermined value. A power relay 114 is provided having a winding 121 and normally open main contacts 115 and normally open sticking contacts 123. The main contacts are included between the buses 106, 107, and 108 and the driving motor 105. A normally open start button 120 is included in series with the winding 121 across the two buses 106 and 107 and a normally closed stop button 122 is included in series with the normally open sticking contacts 123 across the start button 120. An off-normal relay 125 is also provided having a winding 126 included in series with the off-normal contacts 112 of the off-normal voltmeter 110 across the two buses 106 and 107. The off-normal relay 125 includes a pair of normally closed contacts 127 in series with a "normal" pilot light 128 across the two buses 106 and 107 and also includes a pair of normally open contacts 129 in series with an "off-normal" pilot light 130 across the two buses 106 and 107. A bell 131 is connected in parallel with the "off-normal" pilot light 130. The off-normal relay 125 also includes a pair of normally closed contacts 132 in series with the stop button 122 and the sticking contacts 123 of the power relay 114.

To determine variations in eccentricity of a coaxial cable 72 along its length, the spool on which the coaxial cable is wound is positioned in the cable feeding mechanism as a pay-out reel 94 with the ends of the outer and inner conductors 71 and 73 of the cable 72 on the innermost winding thereof on the pay-out reel electrically connected together. The opposite end of the cable 72 is threaded onto the take-up reel 95 with the ends of the outer and inner conductors 71 and 73 of the coaxial cable 72 respectively connected to the two slip rings 103 and 104. The two segments 81 and 82 of the yoke 74 are unlocked and the yoke 74 opened and the cable 72 introduced through the opening in the yoke 74 into the test region. The two segments 81 and 82 of the yoke 74 are then locked together in the manner hereinabove set forth. The guide rollers 90, 91, 92, and 93 are then positioned about the cable 72 in a manner suitable for supporting the cable 72 in the test region between the poles 75, 76, and 77 with the axis of the cable 72 substantially parallel to the axis of the magnetic field generator 70.

In order to initiate operation of the cable testing apparatus, the circuit breaker 113 is closed connecting the buses 106, 107, and 108 to a source of three phase power, and thus causing a rotating magnetic field to be established in the test region at the center of the magnetic field generator 70 in the manner hereinabove explained. As the magnetic field rotates, electromotive forces are induced along the outer and inner conductors 71 and 73, respectively, of the coaxial cable 72. The difference between the electromotive forces induced along the outer and inner conductors 71 and 73 is communicated through the slip rings 103 and 104 and the brushes 109a and 109b to the input of the amplifier 111 and the difference in electromotive force amplified and impressed upon the voltmeter 110. Accordingly, the position of the indicator hand 110a of the voltmeter 110 indicates an electromotive force corresponding to the eccentricity of the section of the coaxial cable 72 located in the test region. Also, when the circuit breaker 113 is closed, the circuit including the "normal" pilot light 128 is completed through the normally closed contacts 127 of the off-normal relay 125. If the eccentricity of the section of the cable 72 in the test region is less than a predetermined value, the normally open contacts 112 of the meter 110 remain open and the "normal" pilot light 128 remains lit. However, if the eccentricity of the section of the cable 72 in the test region is greater than the aforementioned predetermined value, the normally open contacts 112 of the meter 110 are closed and the winding 126 of the off-normal relay 125 is energized. When the winding 126 of the off-normal relay is thus energized, the normally closed contacts 127 are opened thus de-energizing the "normal" pilot light 128 and the normally open contacts 129 are closed thus energizing the "off-normal" pilot light 130 and the bell 131.

Considering now the operation of the feeding mechanism when the eccentricity of the section of the cable 72 initially positioned in the test region has a value less than the aforementioned predetermined value, the feeding of the cable through the test region is initiated by momentarily depressing the start button 120. When the start button 120 is depressed, the winding 121 of the power relay 114 is connected across the two buses 106 and 107, thus energizing the power relay 114 and closing the normally open main contacts 115, thereby connecting the driving motor 105 to the buses 106, 107, and 108 which have been previously energized. Simultaneously, the normally open sticking contacts 123 are closed, thereby completing a circuit through the winding 121 of the power relay 114 through the normally closed contacts 132 of the off-normal relay 125 and through the stop switch 122 across the two buses 106 and 107, thus energizing the winding 121 of the power relay 114 continuously, even when the start button 120 is subsequently released thereby retaining the power relay 114 in its operated condition. When connected to the source of three phase power, the driving motor 105 operates the cable feeding mechanism causing the take-up reel 95 to rotate at a suitable pre-established testing speed and drawing the cable 72 from the pay-out reel 94 through the test region onto the take-up reel 95. While being drawn through the test region, the cable 72 is maintained in a substantially fixed predetermined position therein by means of the guide rollers 90, 91, 92, and 93. By virtue of the action of the friction brake 99, the cable 72 remains taut while being drawn through the test region.

As the cable 72 is drawn through the test region, the difference between the electromotive forces induced along the outer and inner conductors 71 and 73, respectively, in the sections of the cable 72 successively fed into the test region varies in accordance with the eccentricity of the cable 72 in these sections, and the changes in eccentricity of the cable from section to section are indicated by the pointer 110a of the voltmeter 110. As long as the eccentricity of the sections of cable subjected to test in the test region remains below the aforementioned predetermined value, the normally open off-normal contacts 112 of the voltmeter 110 remain open, and the "normal" pilot light 128 remains energized. However, as soon as a section of the cable 72 having an eccentricity greater than the aforementioned predetermined value enters the test region, the off-normal contacts 112 of the voltmeter 110 are closed, causing the winding 126 of the off-normal relay 125 to become energized. When the winding of the off-normal relay 125 is thus energized, the normally closed contacts 127 are opened and the normally open contacts 129 are closed, thus de-energizing the "normal" pilot light 128 and energizing the "off-normal" pilot light 130 and energizing the bell 131. Simultaneously, upon energization of the winding 126 of the off-normal relay 125, the normally closed contacts 132 of the off-normal relay 125 are opened, thereby opening the circuit including the power relay winding 121 and the stop switch 122 and sticking contacts 123, thus de-energizing the power relay winding 121. When the winding 121 is thus de-energized, the power relay 114 is restored to its normal position and the main contacts 115 thereof are opened de-energizing the driving motor 105 and accordingly arresting the operation of the feeding mechanism which thereupon stops quickly by virtue of the resistance offered by the brake 99 on the pay-out reel axle 96. When operation of the feeding mechanism is thus arrested, the section of the cable of abnormal eccentricity is marked on the exterior surfaces of the cable with a legend indicating the eccentricity in any suitable manner.

In order to determine the extent of the portion of the cable of abnormal eccentricity, the start button 120 is depressed and held in its operated position thereby energizing the winding 121 of the power relay 114 and causing the cable 72 to be continuously fed through the testing mechanism. When a section of the cable of normal eccentricity next enters the testing device 69, the contacts 112 of the off-normal voltmeter 110 are opened, thus de-energizing the winding 126 of the off-normal relay 125. When the winding 126 of the off-normal relay 125 is thus de-energized, the contacts 129 are opened and the contacts 127 closed. Thus, when the winding 126 of the off-normal relay 125 is de-energized, the "off-normal" pilot light 130 and the bell 131 are de-energized, and the "normal" pilot light 128 is energized. Simultaneously, upon de-energization of the winding 126 of the off-normal relay 125, the closing of the contacts 132 completes the circuit including the sticking contacts 123 and the winding 121 of the power relay 114, thus permitting the start switch 120 to be released without de-energizing the winding 121 of the power relay 114. With the winding 121 of the power relay 114 thus energized again through the circuit including the sticking contacts 123, the automatic operation of the cable feeding mechanism is resumed.

When sections of cable 72 of normal eccentricity are being fed through the testing device 69 in the manner hereinabove described, the operation of the cable feeding mechanism may be arrested at any time by depressing the button of the normally closed stop switch 122. When this button is depressed, the stop switch 122 is opened thus disconnecting the winding 121 of the power relay 114 from the two buses 106 and 107. The resultant de-energization of the winding 121 causes the power relay 114 to restore to its normal position thereby opening the main contacts 115 and thereby disconnecting the driving motor 105 from the source of alternating current power.

As the cable is being fed through the testing region, various sections of the cable are marked on the exterior surface thereof with legends denoting values of eccentricity as indicated by the meter 110, or as indicated by the off-normal relay 125. If desired, instead of marking the cable with legends in terms of eccentricity at the various sections thereof, the cable may be marked with legends in terms of some other characteristic of the cable related to the eccentricity. Such characteristics include, for example, the safe operating voltage that may be applied between the conductors of the coaxial cable at the various sections thereof, or the impedance, or reflection coefficient, or attenuation constant, offered by the coaxial cable to radio frequency waves propagated through the annular space between the outer and inner conductors thereof.

In view of the foregoing, it will be understood that the variations in relative positions of any two conductors of a cable along the length thereof may be determined by feeding the cable through a rotating magnetic field along a line more or less parallel to the axis of rotation and measuring the changes occurring in the resultant difference between the alternating electromotive forces induced in the conductors.

Referring now to Fig. 5, there is illustrated another form of cable testing apparatus embodying features of the present invention adapted to present on a viewing screen of a cathode ray tube an actual cross sectional picture of the section of a coaxial cable undergoing test. This cable testing apparatus comprises a testing device 149 including a magnetic field generator 150 for establishing a rotating magnetic field which is substantially constant and which is substantially homogeneous over a test region in which a section of a coaxial cable 152 to be tested is disposed. In additon, the testing apparatus 149 includes a circuit arrangement comprising a cathode ray tube 200 controlled jointly in accordance with the intensity of the rotating magnetic field and in accordance with the difference in the electromotive forces respectively induced along the lengths of the outer and inner conductors 151 and 153 of the coaxial cable 152 for indicating on the cathode ray tube viewing screen 208 the actual position of the inner conductor 153 with respect to the outer conductor 151 of the coaxial cable 152.

More particularly, the magnetic field generator 150 comprises first, second, and third pairs of poles 155a—155b, and 156a—156b, and 157a—157b, respectively, and first, second, and third field windings 158, 159, and 160, respectively associated with said pole pairs, and a circular yoke 154, the poles 155a, 155b, 156a, 156b, 157a, and 157b extending radially inward therefrom. The first pair of poles 155a—155b are disposed along a vertical line and the second pair of poles 156a—156b are inclined 60° in one direction from the vertical and the third pair of poles 157a—157b are inclined 60° in the opposite direction from the vertical, the six poles being equally spaced circumferentially within the circular yoke 154. The three field windings 158, 159, and 160 are star-connected to a three phase power line comprising first, second, and third conductors 161, 162, and 163 respectively connected to a source of three phase power. Each of the windings 158, 159, and 160 is equally divided between opposite poles of the corresponding pair of poles, the entire arrangement constituting, in effect, a three phase six pole stator. When equal three phase alternating currents are supplied to the field windings 158, 159, and 160 of such a stator of suitable design, a substantially homogeneous magnetic field of substantially constant intensity is established in a test region defined by the tips of the six poles 155a, 155b, 156a, 156b, 157a, and 157b, this magnetic field rotating at a substantially uniform rate about the central axis of the magnetic field generator 150. For purposes of explanation, it is here assumed that the phases of the alternating currents supplied to the three field windings 158, 159, and 160 are so related that the magnetic field generated in the test region rotates in a counterclockwise direction about the central axis of the magnetic field generator 150, as indicated by the arrow 165, and that when the instantaneous value of the alternating current through the field coil 158 is a maximum, the magnetic field in the test region is vertical.

A step-up transformer 170 is provided having its primary winding 171 connected across the second and third power line conductors 162 and 163, and having its secondary winding 172 connected across the input 173 of a first phase transformation network 174. The first phase transformation network 174 has first and second output terminals 175 and 176, respectively, and is of such design that the single phase alternating current voltage applied to its input 173 is transformed into two voltages at the output terminals 175 and 176 which are 90° out of phase, the two voltages referred to appearing between the respective output terminals 175 and 176 and ground. More particularly, the first phase transformation network 174 includes a first resistor 177 and a first condenser 178 connected in series across the input 173, and a second resistor 179 and a second condenser 180 connected in series across the first condenser 178, the second resistor 179 being connected to the junction between the first resistor 177 and the first condenser 178. The ends of the two condensers 178 and 180 remote from the resistors 177 and 179 and also the side of the input 173 to which they are directly connected, are grounded. The first terminal 175 is connected to the ungrounded side of the input 173, that is at a point between the resistor 177 and the adjacent end of the secondary winding 172 of the transformer 170. The second output terminal 176 is connected to the junction between the second resistor 179 and the second condenser 180. The constants of the resistors 177 and 179 and the condensers 178 and 180 are so proportioned that the output voltage at the second output terminal 176 leads the output voltage at the first output terminal 175 by 90°.

Adjacent ends of the outer and inner conductors 151 and 153 at one end of the coaxial cable 152 are electrically connected together while the ends of the outer and inner conductors 151 and 153 at the other end of the coaxial cable 152 are connected to the input 182 of voltage amplifier 183, the outer conductor 151 being connected to the grounded side of the input 182. The output 184 of the amplifier 183 is connected through an adjustable phase shifter 185 to the input 186 of a second phase transformation network 187 similar to the first phase transformation network 174 hereinabove described. The second phase transformation network 187 has first and second output terminals 188 and 189, respectively, and is also of such design that the single phase alternating current voltage applied to its input 186 is transformed into two voltages at the output terminals 188 and 189 which are 90° out of phase, the two voltages referred to here likewise appearing between the respective output terminals 188 and 189 and ground. More particularly, the second phase transformation network 187 includes a first resistor 190 and a first condenser 191 connected in series across the input 186 and a second resistor 192 and a second condenser 193 connected in series across the first condenser 191, the second resistor 192 being connected to the junction between the first resistor 190 and the first condenser 191. The ends of the two condensers 191 and 193 remote from the resistances 190 and 192 and the side of the input 186 to which they are directly connected, are grounded. The first output terminal 188 is connected to the other side of the input 186, that is, at a point between the resistor 190 and the output of the phase shifter 185. The second output terminal 189 is connected to the junction between the second resistor 192 and the second condenser 193. The constants of resistors 190 and 192 and the condensers 191 and 193 are so proportioned that the output voltage at the second output terminal 189 leads the output voltage at the first output terminal 188 by 90°.

The cathode ray tube 200 has an electron emissive cathode 201, an electron beam intensity control grid 202, an electron accelerating anode 203, upper and lower vertical beam deflection plates 204 and 205, respectively, left and right horizontal beam deflection plates 206 and 207, respectively, and a fluorescent anode 208 in the form of a viewing screen. The accelerating anode 203 is grounded; the electron emissive cathode 201 is maintained at a high negative potential by means of a battery 210 connected between the accelerating anode 203 and the cathode 201; and the beam intensity control grid 202 is maintained negative with respect to the cathode 201 by means of a bias battery 211. A resistor 212 is connected between the bias battery 211 and the electron emissive cathode 201 for impressing suitable electron beam intensity control voltages on the control grid 202 in a manner more fully set forth hereinbelow. The horizontal deflection plates 206 and 207 of the cathode ray tube 200 are connected across the output 215 of a first balanced amplifier 216. Similarly, the vertical deflection plates 204 and 205 of the cathode ray tube 200 are connected across the output 217 of a second balanced amplifier 218.

A control network 219 is provided which operates to alternately impress the output voltages of the respective phase transformation networks 174 and 187 periodically on the inputs 220 and 221 of the balanced amplifiers 216 and 218. The control network 219 also operates to impress a control voltage periodically on the beam intensity control grid 202 of the cathode ray tube 200. The control voltage and the output voltages are so coordinated that the control network 219 operates to produce an image pattern on the screen 208 of the cathode ray tube 200 which represents the cross-sectional arrangement of the outer and inner conductors 151 and 153 in the section of the coaxial cable 152 undergoing test in the testing device 149, as more fully explained hereinbelow.

More particularly, the control network 219 includes an impulse generator 230, an asymmetrical multivibrator 270, an intensity control circuit 290, and an electronic switch 320. The impulse generator 230, the multivibrator 270, and the electronic switch 320 cooperate to alternately transfer voltages from the output terminals 175 and 176 of the first phase transformation network 174 and from the output terminals 188 and 189 of the second phase transformation network 187 periodically through the balanced amplifiers 216 and 218 to the beam deflection control plates 204, 205, 206, and 207 of the cathode ray tube 200. The impulse generator 230 and the multivibrator 270 cooperate to produce a periodically variable control voltage in the intensity control circuit 290 which is used to control the intensity of the electron beam projected onto the screen 208 of the cathode ray tube 200. The operation of this cable testing apparatus is facilitated by operating the control network 219 periodically at a frequency half that supplied from the power source to the magnetic field generator 150. This is accomplished by operating the multivibrator 270 at half the power line frequency.

Considering in a general way a cycle of operation beginning at an instant when the rotating magnetic field produced by the magnetic field generator 150 is vertical, it will be assumed for simplicity of explanation that the power line frequency is 60 cycles per second and that the control network 219 operates at 30 cycles per second. For convenience, a cycle of operation is divided into four quarters as indicated in Figs. 11a to 11g, the first quarter beginning at time $T_0$ and ending at time $T_1$; the second quarter beginning at time $T_1$ and ending at time $T_2$; the third quarter beginning at time $T_2$ and ending at time $T_3$; and the fourth quarter beginning at time $T_3$ and ending at time $T_4$. For convenience, a cycle of operation is also divided into first and second operating portions, the first operating portion overlapping the first and second quarters and the second portion being encompassed within the third and fourth quarters as more fully set forth hereinbelow. The current through the field winding 158 on the vertical poles 155a and 155b of the magnetic field generator 150 varies sinusoidally at 60 cycles per second, passing through a maximum in one direction at times $T_0$, $T_2$, and $T_4$ and through a maximum in the opposite direction at times $T_1$ and $T_3$, as illustrated in Fig. 11a. The magnetic field rotates in a counterclockwise direction, the angular position of the magnetic field relative to a vertical axis changing from 0° to 180° and then to 360° at a uniform rate twice in each cycle of operation, as illustrated in Fig. 11b. More specifically, the magnetic field makes an angle of 0° with the vertical at times $T_0$, $T_2$, and $T_4$ thus pointing vertically upward at these times, and makes an angle of 180° with the vertical at times $T_1$ and $T_3$, thus pointing vertically downward at these times. The voltage induced between the outer and inner conductors 151 and 153 of the coaxial cable reaches a maximum when the rotating magnetic field extends along a line through the axes of the conductors 151 and 153. Thus, for example, with the inner conductor 153 positioned 30° counterclockwise from a vertical line passing through the axis of the outer conductor 151, the voltage induced between the outer and inner conductors 151 and 153 of the coaxial cable 152 lags the current through the field coil 158 by a time phase angle of 30° reaching a maximum value in one direction 1/120 sec. after times $T_0$, $T_2$, and $T_4$ and reaching a maximum value in the other direction 1/120 sec. after times $T_1$ and $T_3$ as illustrated in Fig. 11c.

Assume for simplicity of explanation that the current through the input 173 of the first phase transformation network 174 is in phase with the current through the field coil 158 and that the voltage at the first output terminal 175 of the phase transformation network 174 is likewise in phase with the current through the field coil 158, as illustrated in Fig. 11d. Then, the voltage at the second output terminal 176 of the phase transformation network 174 leads the current through the field coil 158 by 90°, as illustrated in Fig. 11e. In a similar manner, assuming for simplicity of explanation that no phase change occurs in the amplifier 183 and the phase shifter 185, the voltage at the first output terminal 188 of the second phase transformation network 187 is in phase with the voltage difference between the outer and inner conductors 151 and 153 of the coaxial cable 152, as illustrated in Fig. 11f. Likewise then, the voltage at the second output terminal 189 of the second phase transformation network 187 leads the voltage difference between the inner and outer conductors of the coaxial cable by 90°, as illustrated in Fig. 11g. It will be understood, of course, that the phase relations of the voltages at the output of the second phase transformation network 187 relative to the voltage between the second and third conductors 162 and 163 to which the input 173 of the first phase transformation network 174 is connected may be varied either by adjustment of the phase shifter 185 or by rotary adjustment of the magnetic field generator 150 about its axis to establish the appropriate phase relations between the voltages at the output terminals of the two phase transformation networks 174 and 187.

Considering now the general arrangement and operation of the elements in the control system 219, the impulse generator 230 is provided with two terminals 231a and 231b at the input 231 thereof and first and second output terminals 232 and 233, respectively, at the output 234 thereof. The second and third conductors 162 and 163 are connected respectively to the input terminals 231a and 231b of the impulse generator 230. The alternating current voltages appearing between these conductors 162 and 163 impressed on the input 231 of the impulse generator 230 are converted therein into sharp positive pulses which appear at the first output terminal 232 thereof and sharp negative pulses which appear at the second output terminal 233 thereof. The constants of the elements forming the impulse generator 230 are so selected that these sharp pulses appear at the output 234 at the same time that the magnetic field produced in the inductive field generator 150 is vertical; that is, at times $T_0$, $T_1$, $T_2$, $T_3$, and $T_4$, as illustrated in Fig. 11h. The first operating portion of the cycle of operation includes the intervals during which the sharp pulses exist at times $T_0$, $T_1$, and $T_2$ and the second operating portion of the cycle of operation includes the remaining part of the cycle of operation.

The multivibrator 270 is provided with an input terminal 271, a first output terminal 272, a second output terminal 273, and a third output terminal 274. The multivibrator 270 generates rectangular waves which appear at the output terminals 272, 273, and 274 thereof, as more fully set forth hereinbelow, the free period of the oscillations of the multivibrator being slightly greater than twice the first operating portion of the cycle of operation. The input terminal 271 of the multivibrator 270 is connected to the first output terminal 232 of the impulse generator 230. Positive pulses transmitted from the output 234 of the impulse generator 230 to the input terminal 271 of the multivibrator 270 cause the signals appearing at the output terminals 272, 273, and 274 to vary in synchronism with the rotation of the magnetic field in the magnetic field generator 150 forcing the oscillation of the multivibrator 270 to be asymmetrical. More particularly, the voltage appearing at the first output terminal 272 of the multivibrator 270 falls to a low positive value shortly before time $T_0$ and remains at this value until shortly after time $T_2$, then rises to a relatively high positive value where it remains until shortly before time $T_4$, as illustrated in Fig. 11i. And, more particularly, the voltage appearing at the second output terminals 273 of the multivibrator 270, and also the voltage appearing at the third output terminal 274 of the multivibrator 270 rises to a relatively high positive value shortly before time $T_0$ and remains at that value until shortly after time $T_2$, then falls to a relatively low positive value where it remains until a time shortly before time $T_4$, as illustrated in Fig. 11j. Thus, the voltage at the first output terminal 272 is of a relatively low positive value and the voltages appearing at the second and third output terminals 273 and 274 are of a relatively high positive value during the first operating portion of the cycle, and the voltage at the first output terminal 272 is of a relatively high positive value and the voltages appearing at the second and third output terminals 273 and 274 are of a relatively low positive value during the second operating portion of the cycle.

The intensity control circuit 290 is provided with first and second input terminals 291 and 292, respectively, and an output terminal 293. The output terminal 293 is connected to the junction between the battery 211 and the resistor 212 between the cathode 201 and the grid 202 of the cathode ray tube 200. The first input terminal 291 of the intensity control circuit 290 is connected to the third output terminal 274 of the multivibrator 270. The second input terminal 292 of the intensity control circuit 290 is connected to the second output terminal 233 of the impulse generator 230. Rectangular voltage waves appearing at the third output terminal 274 of the multivibrator 270 are thus impressed on the first input terminal 291 of the intensity control circuit 290 and negative pulses appearing at the second output terminal 233 of the impulse generator 230 are impressed on the second input terminal 292 of the intensity control circuit 290. The intensity control circuit 290 is so arranged that the voltage appearing at the output terminal 293 is positive whenever the voltage impressed on the first input terminal 291 is of a relatively high value and whenever the voltage impressed on the second input terminal 292 is of a relatively low value and is negative at all other times. Thus the voltage appearing at the output terminal 293 of the intensity control circuit 290 rises to a positive value shortly before time $T_0$ and remains at that value until shortly after time $T_2$; then falls to a negative value where it remains until a time shortly before the time $T_3$ when it rises again to a positive value for a short interval, falling again to a negative value shortly after time $T_3$ where it remains until a time shortly before time $T_4$, as illustrated in Fig. 11k. More particularly, the voltage at the output terminal 293 is positive during the first operating portion of the cycle of operation and for a short interval in the middle of the second operating portion and is negative in the remaining part of the second operating portion. When this control voltage is positive it reduces the bias on the control grid 202 of the cathode ray tube 200 causing an intense beam of electrons to be projected through the accelerating anode 203 to the screen 208 and when this control voltage is negative it increases the bias on the control grid 202 cutting off the electron beam entirely.

The electronic switch 320 is provided with first, second, third, and fourth input terminals 321, 322, 323, and 324, respectively, first and second output terminals 325 and 326, respectively, and first and second control terminals 327 and 328, respectively. The first and second input terminals 321 and 322 are connected respectively to the second and first output terminals 176 and 175 of the first phase transformation network 174. Similarly, the third and fourth input terminals 323 and 324 are connected respectively to the first and second output terminals 188 and 189 of the second phase transformation network 187. The first and second output terminals 325 and 326 of the electronic switch 320 are connected respectively to the inputs 220 and 221 of the first and second balanced amplifiers 216 and 218. The first and second control terminals 327 and 328 of the electronic switch 320 are connected respectively to the first and second output terminals 272 and 273 of the multivibrator 270.

In operation, when the control voltage applied to the first control terminal 327 is at a relatively low positive value, that is, during the first portion of the cycle of operation, a connection is provided within the electronic switch 320 between the first input terminal 321 and the first output terminal 325 and another connection is provided within the electronic switch 320 between the second input terminal 322 and the second output terminal 326. Similarly, in operation when the control voltage applied to the second control terminal 328 is at a relatively low positive value, a connection is provided within the electronic switch 320 between the third input terminal 323 and the second output terminal 326 and another connection is provided within the electronic switch 320 between the fourth input terminal 324 and the first output terminal 325. Thus when the voltage at the first control terminal 327 is at a relatively low positive value, the voltage appearing at the first output terminal 175 of the first phase transformation network 174 is transmitted through the second balanced amplifier 218 to the vertical deflection plates 204 and 205 of the cathode ray tube 200, and the voltage appearing at the second output terminal 176 of the first phase transformation network 174 is transmitted through the first balanced amplifier 216 to the horizontal deflection plates 206 and 207 of the cathode ray tube 200. The resultant electric fields between the plates are 90° out of phase and are so proportioned that they cause the electron beam projected from the cathode 201 through the accelerating anode 203 to the screen 208 of the cathode ray tube 200 to scan a first circular path 410 on the screen 208 having a radius substantially proportional to the amplitude of the electromotive force appearing between the two conductors 162 and 163 of the three phase power line and substantially proportional to the intensity of the rotating magnetic field produced by the generator 150. Similarly, in operation when the voltage at the second control terminal 328 is at a relatively low positive value, that is, during the second portion of the cycle of operation, the voltage appearing at the first output terminal 188 of the second phase transformation network 187 is transmitted through the second balanced amplifier 218 to the vertical deflection plates 204 and 205 of the cathode ray tube 200, and the voltage appearing at the second output terminal 189 of the second phase transformation network 187 is transmitted through the first balanced amplifier 216 to the horizontal deflection plates 206 and 207 of the cathode ray tube 200. As before, the resultant electric fields between the respective pairs of plates are 90° out of phase and in this case are so proportioned that they cause the electron beam projected from the cathode 201 through the accelerating anode 203 to the screen 208 of the cathode ray tube 200 to scan a second circular path (not shown) on the screen, concentric with the first circular path 410 and having a radius proportional to the amplitude of the difference in the electromotive forces induced along the lengths of the outer and inner conductors 151 and 153 of the coaxial cable 152 by the rotating magnetic field.

Considering now the general operation of the cable testing apparatus illustrated in Fig. 5, it will be noted that while the voltages appearing at the output of the first phase transformation network 174 are being transferred to the deflection plates 204, 205, 206, and 207 of the cathode ray tube 200 during the first operating portion of the cycle of operation, the bias on the intensity control grid 202 of the cathode ray tube 200 is at a relatively low value. Thus, when the voltages appearing at the output of the first phase transformation network 174 are impressed on the deflection plates 204, 205, 206, and 207 of the cathode ray tube 200, a visible circular image 410 is produced on the screen. Similarly, it will be noted that while the voltages appearing at the output of the second phase transformation network 187 are being transferred to the deflection plates 204, 205, 206, and 207 of the cathode ray tube 200 during the second operating portion of the cycle of operation, the bias on the intensity control grid 202 of the cathode ray tube 200 is at a relatively high value except for a short interval at time $T_3$. Thus, when the voltages appearing at the output of the second phase transformation network 187 are impressed on the deflection plates 204, 205, 206, and 207 of the cathode ray tube 200, a spot image 412 is produced on the screen 208. The distance of the spot image 412 from the center of the circular image 410 is substantially proportional to the distance between the axes of the outer and inner conductors 151 and 153 of the coaxial cable 152. Likewise, the direction of this spot 412 from the center of the circular image 410 corresponds to the direction of the axis of the inner conductor 153 from the axis of the outer conductor 151 of the coaxial cable 152. In practice, the circuit constants of the various elements of the magnetic field generator 150 and the control network 219 are so chosen that the radius of the circular image 410 is proportional to the intensity of the rotating magnetic field generated by the field generator 150 irrespective of variations in the voltage supplied to the field coils 158, 159, and 160 from the three phase power line within the range of operation. More particularly, this is accomplished by operating the transformer 170 and the generator 150 over about the same portion of the magnetization curve of the iron used in each. Likewise, in practice, the circuit constants of the various elements of the control network 219 are so chosen that the position of the spot image 412 within the circular image 410 corresponds geometrically to the position of the inner conductor 153 within the outer conductor 151 of the coaxial cable 152 irrespective of variations in the voltage supplied to the field coil windings 158, 159, and 160 from the three phase power line. Under these conditions the image pattern formed on the screen 208 of the cathode ray tube 200 presents an actual cross sectional view of the section of the cable 152 undergoing test.

Figure 6:
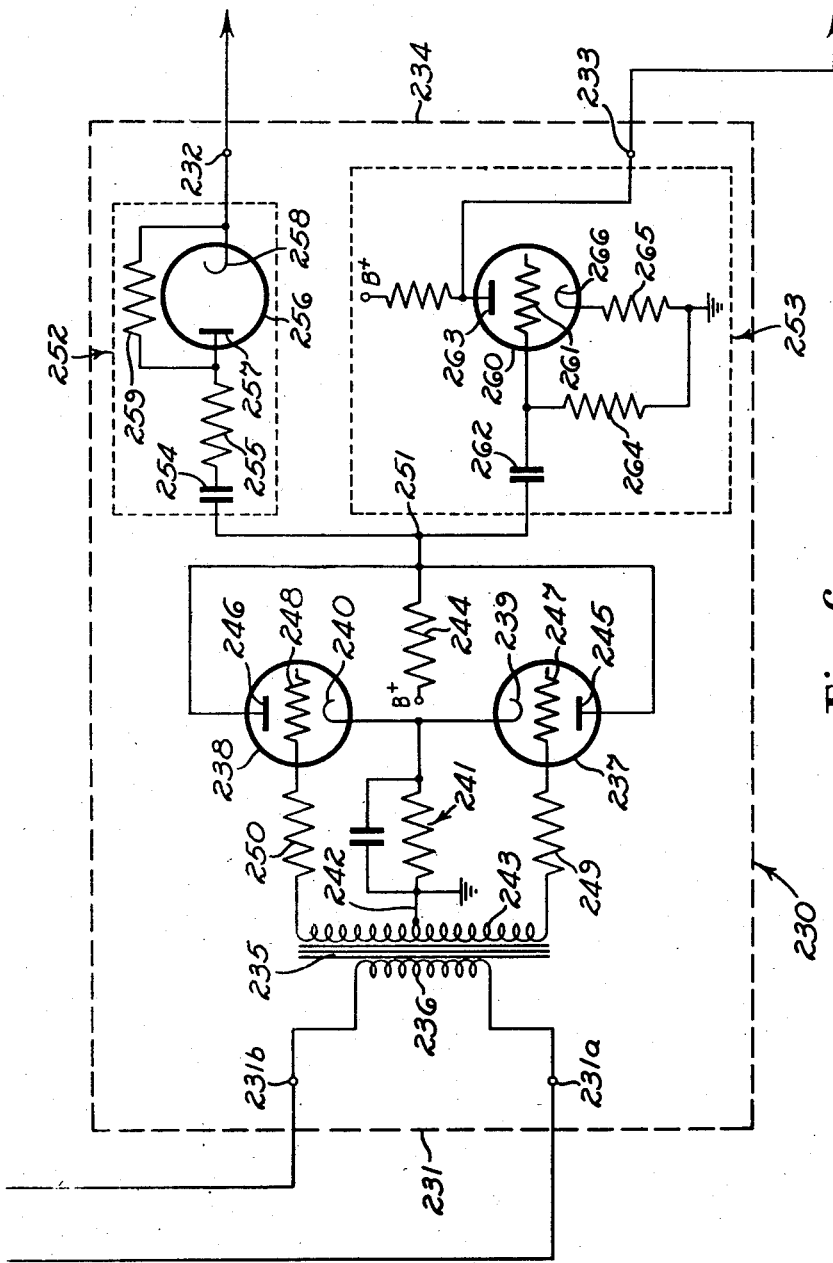
Fig. 6 is a schematic wiring diagram of the impulse generator of the control network of Fig. 5.

Referring now to Fig. 6, there is shown a detailed wiring diagram of the impulse generator 230. The impulse generator 230 includes an input voltage step-up transformer 235 having opposite ends of its primary winding 236 connected between the input terminals 231a and 231b. The impulse generator 230 also includes a pair of triodes 237 and 238. The cathodes 239 and 240 of the triodes 237 and 238 are connected through a common parallel resistor-condenser network 241 to the grounded center tap 242 of the secondary winding 243 of the transformer 235. The anodes 245 and 246 of the triodes 237 and 238 are connected through a common load resistance 244 to the positive terminal of a voltage supply. And the control grids 247 and 248 respectively of the triodes 237 and 238 are connected to opposite ends of the secondary winding 243. Relatively high grid leak resistors 249 and 250 of the order of 100,000 ohms are connected between the respective control grids 247 and 248 and the corresponding ends of the secondary winding 243. The time constant of the resistor-condenser network 241 is long compared to the period of a cycle of operation.

The voltage appearing at the junction 251 is impressed through a unilateral coupling network 252 to the first output terminal of the impulse generator 230 and thence to the input terminal 271 of the multivibrator 270. The voltage appearing at the junction 251 is similarly impressed through a phase inverting network 253 to the second output terminal 233 of the impulse generator and thence to the second input terminal 292 of the intensity control circuit 290.

The coupling network 252 includes a blocking condenser 254, a current limiting resistor 255 and a diode 256 connected in series. The anode 257 of the diode 256 is connected to the junction 251 through the resistor 255 and the condenser 254, and the cathode 258 of the diode 256 is connected to the first output terminal 232 of the impulse generator 230. A by-pass resistor 259 is connected between the cathode 258 and anode 257 of the diode 256 in order to prevent accumulation of electrical charge on the cathode 258 and the anode 257. The coupling network 252 operates unilaterally to transmit positive pulses to the multivibrator 270 and to block the return of positive pulses from the multivibrator 270 to the junction 251 and thence to the phase inverting network 253. The phase inverting network 253 includes triode 260 connected as a degenerative amplifier having an input resistor 264 connected between the grid 261 and ground and a bias resistor 265 connected between cathode 266 and ground. The control grid 261 of this triode 260 is connected through a coupling condenser 262 to the junction 251 and the anode 263 of the triode 260 is connected to the second output terminal 233 of the impulse generator.

Considering now the cycle of operation of the impulse generator 230, when alternating current is impressed on the primary winding 236 of the transformer 235, relatively high alternating voltages are induced in the secondary 243 thereof and communicated through the grid leak resistors 249 and 250 to the control grids 247 and 248 of the respective triodes 237 and 238, the voltages impressed thereon being out of phase. When the voltage impressed on the control grid 247 of the triode 237 is negative, very little current flows from the cathode 239 to the anode 245, but when this control grid 247 is driven positive, considerable current flows both to the grid 247 and to the anode 245. The current flowing to the grid 247 passes through the grid leak resistance 249 effectively maintaining the grid 247 at a substantially constant potential during the major portion of the positive quarters of the cycle of operation. As a result, the current flowing to the anode 245 reaches a relatively high, substantially constant value during the positive quarters of the cycle of operation. Thus the current flowing to the anode 245 attains a relatively low value throughout most of the first and third quarters of the cycle of operation and attains a relatively high value throughout most of the second and fourth quarters thereof, as illustrated in Fig. 11*l*. In a similar manner, the current to the anode 246 of the triode 238 attains a relatively high value throughout most of the first and third quarters of the cycle of operation and attains a relatively low value throughout most of the second and fourth quarters of the cycle of operation, as illustrated in Fig. 11*m*. The total current through the common resistance 244 and the common resistor condenser network 241 remains at a substantially high value throughout the cycle of operation except at the times $T_0$, $T_1$, $T_2$, $T_3$, and $T_4$ when it dips sharply for a very short time, as illustrated in Fig. 11*n*. As a result, the voltage at the junction 251 between the resistance 244 and the two anodes 245 and 246 of the triodes 237 and 238 remains at a relatively low value throughout the cycle of operation except at the times $T_0$, $T_1$, $T_2$, $T_3$, and $T_4$ when it rises sharply for a short time. Thus sharp voltage pulses are produced at the output 234 periodically at a frequency twice that of the input voltage, that is, at a frequency of 120 cycles per second, as previously illustrated in Fig. 11*h*.

In view of the foregoing, it will be understood that the impulse generator supplies positive pulses to the multivibrator 270 and negative pulses to the intensity control circuit 290 at times $T_0$, $T_1$, $T_2$, $T_3$, and $T_4$ in the cycle of operation, that is at the times when the magnetic field being generated in the test region of the inductive field generator 150 is vertical.

Referring now to Fig. 7, there is shown a conventional detailed wiring diagram of the multivibrator 270. This multivibrator 270 comprises a first triode 275 having a grounded cathode 276, a control grid 277, and an anode 278, and also comprises a second triode 280 having a grounded cathode 281, a control grid 282, and an anode 283. The anodes 278 and 283 are connected to the positive terminal of a power supply through corresponding plate resistors 279 and 284. A first grid resistance 285 is connected between the grid 277 and cathode 276 of the first triode 275 and a second grid resistance 286 is connected between the grid 282 and the cathode 281 of the second triode 280. The anode 283 of the second triode 280 is coupled to the grid 277 of the first triode 275 by means of a condenser 287 and the anode 278 of the first triode 275 is coupled to the grid 282 of the second triode 280 by a condenser 288. The grid 277 of the first triode 275 is connected to the input terminal 271. The anode 278 of the first triode 275 is connected to the first output terminal 272 and the anode 283 of the second triode 280 is connected to the second and third output terminals 273 and 274. The circuit constants of the elements of the multivibrator 270 are so selected that when oscillating freely it oscillates at a free frequency slightly less than half the power line frequency, that is, at a frequency slightly less than 30 cycles per second. Preferably the free period equals the duration of the first operating portion of the cycle of operation that is the free period preferably equals $\frac{1}{60}$ sec. plus the duration of one of the pulses generated by the impulse generator 230. In any event the free period is at least as long as the interval of the first operating portion of the operating cycle of the entire control system 219 but substantially less than three quarters of a cycle of operation.

The multivibrator 270 is synchronized with the rotation of the magnetic field produced by the inductive field generator 150. This is accomplished by applying positive pulses from the impulse generator 230 to the grid 277 of the first triode 275 thus forcing the multivibrator to oscillate at half the power line frequency. When thus synchronized, a rectangular voltage wave is produced at the respective anodes 278 and 283 of the triodes 275 and 280. The rectangular voltage wave thus generated at the anode 278 of the first triode 275 is applied to the first output terminal 272 and rises to a relatively high value during the first operating portion of the cycle of operation and a relatively low value during the second operating portion of the cycle of operation as previously explained and as illustrated in Fig. 11*i*. The rectangular voltage wave thus generated at the anode 283 of the second triode 280 is applied to the second and third output terminals 273 and 274 and falls to a relatively low value during the first operating portion of the cycle of operation and rises to a relatively high value during the second operating portion of the cycle of operation as previously explained and as illustrated in Fig. 11*j*.

Referring now to Fig. 8, there is shown a detailed wiring diagram of the intensity control circuit 290. The intensity control circuit 290 includes a first pentode 296 having a cathode 297, and control grid 298, and an anode 300, and also comprises a second pentode 301 having a cathode 302, a control grid 303, and an anode 305. The anodes 300 and 305 of the two triodes 296 and 301 are supplied with high positive potentials in a conventional manner through corresponding resistors 306 and 307. The two cathodes 297 and 302 of the pentodes 296 and 301 are connected to ground through a common bias control resistor 308. The control grids 298 and 303 of the two pentodes 296 and 301 respectively are connected to ground through corresponding first and second resistors 309 and 310 respectively. The control grid 298 of the first pentode 296 is coupled through the condenser 311 to the first input terminal 291 of the intensity control circuit 290, which terminal 291 is in turn connected to the third output terminal 274 of the multivibrator 270. The control grid 303 of the second pentode 301 is coupled through the condenser 312 to the second input terminal 292 of the intensity control circuit 290, which terminal 292 is in turn connected to the second output terminal 233 of the impulse generator 230. The anode 305 of the second pentode 301 is coupled to the output terminal 293 of the intensity control circuit 290 through condenser 313 which in turn is connected to the control grid 202 of the cathode ray tube 200 as hereinabove explained.

Considering now the detailed operation of intensity control circuit 290, when rectangular voltage waves from the third output terminal 274 of the multivibrator 270 are impressed upon the control grid 298 of the first pentode 296, the current through the resistor 308 is varied in a similar manner so that a rectangular voltage wave is applied at the cathodes 297 and 302 of both pentodes 296 and 301. The rectangular voltage wave thus applied to the pentodes 296 and 301 rises to a relatively high positive value during the first operating portion of the cycle of operation and falls to a relatively low value during the second operating portion of the cycle of operation, the relatively high voltage preferably being sufficient to bias the second pentode 301 beyond cutoff and the relatively low voltage being insufficient to bias the second pentode 301 beyond cutoff. Also the negative pulses from the second output terminal 233 of the impulse generator 230 are impressed upon the control grid 303 of the second pentode 301 and are of sufficient magnitude to bias the second pentode 301 beyond cutoff regardless of the value of the bias on the cathode 302 thereof. Thus the second pentode 301 is non-conductive only when the voltage wave impressed on the cathode 302 thereof is of a relatively high value or when a negative pulse is impressed on the control grid 303 thereof. As a result of the combined action of the electromotive forces thus supplied to the second pentode 301 from the multivibrator 270 and from the impulse generator 230, the voltage at the anode 305 of the second pentode 301 rises to a relatively high value during the first portion of the cycle of operation and for a short period at the time T₃ in the middle of the second portion of the cycle of operation, and falls to a relatively low value the rest of the time, the resultant voltage wave appearing at the anode 305 being illustrated in Fig. 11o. The voltage wave thus generated at the anode 305 of the second pentode 301 is applied through the coupling condenser 313 to the junction between the bias battery 211 and the resistor 212 associated with the cathode ray tube 200, thus causing the negative bias on the intensity control grid 202 of the cathode ray tube 200 to be reduced to a relatively low value during the first portion of the cycle of operation and for a short period at the time T₃.

Referring now more particularly to Fig. 9, there is illustrated a detailed wiring diagram of the electronic switch 320. This electronic switch includes first, second, third, and fourth amplifying pentodes 330, 340, 350, and 360, and first, second, third, and fourth bias control triodes 370, 380, 390, and 400, respectively associated therewith in cathode follower relation. The leading electromotive force produced at the second output terminal 176 of the first phase transforming network 174 is coupled to the control grid 331 of the first amplifying pentode 330 through a condenser 332 and a variable potentiometer 333, the slide wire 334 of the potentiometer 333 being directly connected to this grid 331. The lagging electromotive force produced at the first output terminal 175 of the first phase transforming network 174 is coupled to the grid 341 of the second amplifying pentode 340 through a condenser 342 and a variable potentiometer 343, the slide wire 344 of the potentiometer 343 being directly connected to this grid 341. The leading electromotive force produced at the second output terminal 189 of the second phase transforming network 187 is coupled to the grid 351 of the third amplifying pentode 350 through a condenser 352 and a variable potentiometer 353, the slide wire 354 of this potentiometer 353 being directly connected to this grid 351. The lagging electromotive force produced at the first output terminal 188 of the second phase transforming network 187 is coupled to the grid 361 of the fourth amplifying pentode 360 through a condenser 362 and a variable potentiometer 363, the slide wire 364 of the potentiometer 353 being directly connected to this grid 361. The cathode 335 of the first amplifying pentode 330 and the cathode 375 of the first bias control triode 370 are connected to ground through a common resistor 376. Similarly, the cathode 345 of the second amplifying pentode 340 and the cathode 385 of the second bias control triode 380 are connected to ground through a common resistor 386. Similarly, the cathode 355 of the third amplifying pentode 350 and the cathode 395 of the third bias control triode 390 are connected to ground through a common resistor 396. And similarly, the cathode 365 of the fourth amplifying pentode 360 and the cathode 405 of the fourth bias control triode 400 are connected to ground through a common resistor 406. The control grids 371 and 381 of the first and second bias control triodes 370 and 380 are connected to ground through a common resistor 377 and are coupled through a common condenser 378 to first control terminal 327 which in turn is connected to the first output terminal 272 of the multivibrator 270. Likewise the control grids 391 and 401 of the third and fourth bias control triodes 390 and 400 are connected to ground through a common resistor 397 and are coupled through a common condenser 398 to second control terminal 328 which in turn is connected to the second output terminal 273 of the multivibrator 270.

Thus with this arrangement the rectangular voltage wave appearing at the first output terminal 272 of the multivibrator 270 is transferred through the bias control triodes 370 and 380 to the respective cathodes 375 and 385 thereof, causing the amplifying factors of the first and second amplifying pentodes 330 and 340 to be raised to a relatively high value during the first operating portion of the cycle of operation and to be reduced to zero during the second operating portion of the cycle of operation. And likewise with this arrangement, the rectangular voltage wave appearing at the second output terminal 273 of the multivibrator 270 is transferred through the bias control triodes 390 and 400 to the respective cathodes 395 and 405 thereof, causing the amplifying factors of the third and fourth amplifying pentodes 350 and 360 to be reduced to zero during the first operating portion of the cycle of operation and to be raised to a relatively high value during the second operating portion of the cycle of operation. Amplified signals produced at the anodes 336 and 356 of the first and third amplifying pentodes 330 and 350 are applied through a common coupling condenser 337 to first output terminal 325 which in turn is connected to the input 220 of the first balanced amplifier 216 the output of which is connected across the horizontal deflection plates 206 and 207 of the cathode ray tube 200. Likewise, amplified signals produced at the anodes 346 and 366 of the second and fourth amplifying pentodes 340 and 360 are applied through a common coupling condenser 347 to the second output terminal 326 which in turn is connected to the input 221 of the second balanced amplifier 218 the output of which is connected across the vertical deflection plates 204 and 205 of the cathode ray tube 200.

Considering now the detailed operation of the switching system 219, voltage is applied across the horizontal deflection plates 206 and 207 from the second output terminal 176 of the first phase transformation network 174 during the first operating portion of the cycle of operation and from the second output terminal 189 of the second phase transformation network 187 during the second operating portion of the cycle of operation. The manner in which the resultant horizontal electric field varies between the horizontal deflection plates 206 and 207 is illustrated graphically in Fig. 11p where positive values indicate that this electric field is directed to the left and negative values indicate that this electric field is directed to the right. Similarly a voltage is applied across the vertical deflection plates 204 and 205 from the first output terminal 175 from the first phase transformation network 174 during the first operating portion of the cycle of operation and from the first output terminal 188 of the second phase transformation network 187 during the second operating portion of the cycle of operation. The manner in which the resultant vertical electric field varies between the vertical deflection plates 204 and 205 is illustrated graphically in Fig. 11q where positive values indicate that this electric field is directed upward and negative values indicate that this electric field is directed downward. The positions of the contacts 334 and 344 on the respective potentiometers 333 and 343 associated with the first and second amplifying pentodes 330 and 340 are so adjusted that the amplitudes of the resultant horizontal and vertical displacements of the cathode ray tube beam directed to the screen 208 during the first operating portion of the operating cycle are equal. Inasmuch as the horizontal component of the beam deflection forces leads the vertical component by 90° the beam scans the cathode ray tube screen 208 along a first circular path 410 in a clockwise direction, the radius of this circular path varying in proportion to the strength of the magnetic field generated in the test region of the magnetic field generator 150. Similarly the positions of the contacts 354 and 364 on the respective potentiometers 353 and 363 associated with the third and fourth amplifying pentodes 350 and 360 are so adjusted that the amplitudes of the resultant horizontal and vertical displacements of the cathode ray tube beam directed to the screen 208 during the second operating portion of the operating cycle are equal. Inasmuch as the horizontal component of the beam deflection force leads the vertical component by 90° the beam again scans the cathode ray tube screen 208 along a second circular path (not shown) in a clockwise direction, the radius of this circular path varying in proportion to the difference between the electromotive forces induced along the outer and inner conductors 151 and 153 of the coaxial cable 152. The positions of the contacts 334 and 344 on the potentiometers 333 and 343 associated with the first and second amplifying pentodes 330 and 340 are also so adjusted that the ratio of radii of these two circular paths is equal to the eccentricity of the coaxial cable 152.

More particularly during the first operating portion of the cycle of operation, the leading alternating electromotive force produced at the output of the first phase transformation network 174 is amplified by the first amplifying pentode 330 and the first balanced amplifier 216 and the amplified voltage is applied to the horizontal deflection plates 206 and 207 of the cathode ray tube 200 and the lagging alternating electromotive force at the output of the first phase transformation network 174 is amplified by the second amplifying pentode 340 and the second balanced amplifier 218 and the latter amplified voltage is applied to the vertical deflection plates 204 and 205 of the cathode ray tube 200. Since the negative bias on the intensity control grid 202 of the cathode ray tube 200 is relatively low during the first operating portion of the cycle of operation, as hereinabove explained, an intense beam impinges the screen 208 of the cathode ray tube 200 scanning the screen 208 in a clockwise direction along the circular path 410 beginning at a point directly below the undeflected point of impingement of the electron beam on the screen 208. In a similar manner during the second operating portion of the cycle of operation, the leading alternating electromotive force produced at the output of the second phase transformation network 187 is amplified by the third amplifying pentode 350 and the first balanced amplifier 216 and the amplified voltage is applied to the horizontal deflection plates 206 and 207 of the cathode ray tube 200 and the lagging alternating electromotive force produced at the output of the second phase transformation network 187 is amplified by the fourth amplifying pentode 360 and the second balanced amplifier 218 and the latter amplified voltage is applied to the vertical deflection plates 204 and 205 of the cathode ray tube 200. In this case the net effective beam displacement force thus created rotates clockwise from a direction starting initially from a line directed downward and to the right and at time $T_3$ lies along a line pointing upward along a line disposed 30° clockwise from the vertical. Since the negative bias on the intensity control grid 202 of the cathode ray tube 200 is relatively low only for a short period at the time T₃ at the middle of the second operating portion of the cycle of operation, as hereinabove explained, an intense beam impinges the screen 208 of the cathode ray tube 200 only at the time T₃ during this portion of the cycle of operation. The impingement of the electron beam on the screen 208 at the time T₃ produces a spot 412 thereon which is disposed relative to said circular trace 410 in the geometrically same position as the inner conductor 153 of the coaxial cable 152 is disposed within the outer conductor 151 thereof.

While the invention is described herein with particular reference to coaxial cables, it is to be understood that the principles of the invention may also be applied to other types of cables or like elongated bodies including elongated elements in which electromotive forces may be induced by means of any suitable inductive fields. The invention has found particular utility in the testing of "Calrod," or "Corax" heater units. Such a heater unit comprises a tubular metallic sheath enclosing a heater conductor comprising a helical conductive element extending longitudinally therein, the heater conductor being insulated from the sheath by suitable insulating material such as magnesium oxide compacted in the space between the conductor and the sheath. Such a heater conductor includes a straight rigid lead conductor at each end thereof, the location of which with respect to the sheath must be known in order to facilitate bending of the heater units without fracturing the insulating material and without reducing the spacing between the lead conductor and the sheath to such a point that the insulation therebetween may break down electrically in operation. It is to be understood that such an arrangement of a lead conductor and sheath constitutes in effect a co-axial cable in the broad sense of the phrase as used herein.

While the invention has been described hereinabove with particular reference to the determination of the position of an inner conductor with respect to the outer conductor of a coaxial cable by utilizing a rotating magnetic field, it is to be understood that the invention is also applicable to the determination of the relative positions of conductors in other types of cables and that other kinds of rotating inductive fields such as rotating electrostatic fields may be utilized under some circumstances to induce electromotive forces in the conductors for that purpose. It is also to be understood that the relative positions of conductors in a cable may be determined by rotating the cable relative to a stationary inductive field, it only being essential that relative rotation be produced between the cable and the inductive field. It is also to be understood that the principles of the invention may be incorporated in many other embodiments falling within the true spirit and scope of the invention and encompassed within the following claims.

What is claimed is:

1. In apparatus for determining the position of a conductor supported within a body relative to the exterior surfaces thereof, means including a plurality of pole pieces radially disposed about said body, electrical windings about said pole pieces, a power source connected to said windings and including means for supplying currents of different phase to said windings to produce a rotating magnetic field through said body, whereby an electromotive force having a characteristic dependent upon the position of said conductor relative to the exterior surface of said body is induced in said conductor by said field, and an electromotive force responsive device connected to said conductor and measuring the characteristic of the electromotive force induced in said conductor as an index of the position of said conductor relative to the exterior surface of said body.

2. In apparatus for determining the spacing between two mutually insulated conductors supported within a body, means including a magnet having polyphase windings for establishing an inductive field through said body and for producing relative rotation between said field and said body, whereby electromotive forces having a difference depending upon the spacing between said conductors are induced in said conductors by said field, and voltage indicating means connected between said conductors for measuring the difference between said electromotive forces as an index of the spacing between said conductors.

3. In apparatus for determining the position of a conductor with respect to the axis of a tubular sheath in which said conductor is disposed, means for producing an inductive field which rotates about a predetermined axis, means for positioning said sheath in said inductive field with its axis coincident with said predetermined axis, and electromotive force responsive means including a circuit connected to said conductor for indicating the disposition of said conductor in said tubular sheath.

4. In apparatus for determining the position of a conductor supported in a body, means for establishing an inductive field through said body rotating about a predetermined axis therein, and means connected to said conductor and to said inductive field producing means for measuring the relative phase of the electromotive force induced in said conductor by said rotating inductive field with respect to a component of said inductive field along a line in said body transverse to the predetermined axis.

5. In apparatus for determining the relative position of two mutually insulated coaxial conductors of a coaxial cable, means for establishing a magnetic field which rotates about a predetermined axis in said cable, means connected to said cable and to said magnetic field producing means for measuring the phase of the electromotive forces induced along the conductors of said cable by said rotating magnetic field with respect to a component of the magnetic field along a line transverse to said predetermined axis.

6. In apparatus for determining the relative position of two mutually insulated conductors supported in a body, means for establishing an inductive field which rotates about a predetermined axis in said body, means connected to conductors and said inductive field producing means for measuring the relative phase of the difference between the electromotive forces induced in said conductors by said rotating inductive field with respect to a component of the inductive field along a line transverse to said predetermined axis.

7. In apparatus for determining the position of a conductor supported in a body, means for producing an inductive field which rotates about a predetermined axis, means for positioning said body in said inductive field, and means connected to said conductor and to said inductive field producing means for measuring the relative phase of the electromotive force induced in said conductor by said rotating inductive field with respect to a component of said inductive field along a line transverse to the predetermined axis of rotation.

8. In apparatus for determining the position of a conductor supported in a body, means including a source of alternating current for producing an inductive field which rotates about an axis in said body, and means connected to said source of alternating current and to said conductor for indicating the relative phase between the alternating current supplied by said source and the resultant electromotive force induced in said conductor by said rotating inductive field.

9. In apparatus for determining the position of a conductor supported in a body, means including a polyphase winding for producing a rotating magnetic field, means for positioning said body in said magnetic field, and means connected to a portion of said polyphase winding and to said conductor for indicating the relative phase between a voltage impressed on a part of said polyphase winding and the resultant electromotive force induced in said conductor by said rotating magnetic field.

10. In apparatus for determining the eccentricity of a coaxial cable, means for establishing an inductive field that rotates relative to said cable about a predetermined axis therein, and means responsive to said field producing means and a voltage induced in the conductors of said cable by said rotating field for indicating the phase difference therebetween as a measure of the eccentricity of said cable.

11. In apparatus for determining the position of a conductor supported in a body, means for establishing an inductive field that rotates relative to said body about a predetermined axis therein, means defining an indicating area, and means responsive to said field producing means and to a voltage induced in said conductor by said rotating field for producing an indication at a point in said area at a position therein corresponding to the position of said conductor in said body.

12. In apparatus for determining the position of a conductor supported in a body, means for establishing an inductive field which rotates relative to said body about a predetermined axis therein, means defining an indicating area, means responsive to said rotating field producing means for creating a geometrical figure in said area having a dimension corresponding to the strength of said rotating field, and means responsive to said field producing means and to a voltage induced in said conductor by said rotating field for producing an indication at a point in said area at a position relative to said geometrical figure corresponding to the position of said conductor in said body.

13. In apparatus for determining the position of a conductor supported in a body, means including a source of alternating current for producing a rotating magnetic field, means for positioning said body in said magnetic field with said conductor in inductive relation therewith, means defining an indicating area, and means responsive to a voltage produced by said source of alternating current and to a voltage induced in said conductor by said rotating field for producing an indication at a point in said area at a position therein corresponding to the position of said conductor in said body.

14. In apparatus for determining the relative position of two mutually insulated conductors of a cable, means for producing a rotating inductive field through said cable, and means responsive to said field producing means and to the difference in the electromotive forces induced in said conductors by said inductive field for indicating the relative position of said two conductors in the cable.

15. In apparatus for determining the eccentricity of a coaxial cable comprising a pair of conductors comprising an inner conductor disposed within an outer tubular conductor and insulatingly spaced therefrom, means for producing a magnetic field which rotates about a predetermined axis, means for positioning said body in said rotating magnetic field with said conductors transverse thereto, and means responsive to said rotating magnetic field producing means and to the difference in the electromotive forces induced in said conductors by said rotating magnetic field for indicating the position of the inner conductor with respect to the axis of the outer conductor.

16. In apparatus for determining the position of a conductor supported in a body, inductive field producing means for producing an inductive field in said body in alternating inductive relation with said conductor, a cathode ray tube including a screen and a cathode ray source and cathode ray deflecting means for causing the cathode ray to scan said screen and cathode ray intensity control means, and means controlled in accordance with the relative phase between a component of the alternating inductive field produced in said body along a predetermined line and the alternating electromotive force induced in said conductor by said alternating inductive field operatively associated with said cathode ray deflecting means and said cathode ray intensity control means for producing a spot on said screen at a position indicative of the position of said conductor in said body.

17. In apparatus for determining the position of a conductor supported in a body, inductive field producing means including a source of alternating current for producing an inductive field in said body in alternating inductive relation with said conductor, a cathode ray tube including a screen and a cathode ray source and cathode ray deflecting means for causing the cathode ray to scan said screen and cathode ray intensity control means, and means responsive to the relative phase between the alternating current supplied by said source and the alternating electromotive force induced in said conductor by said alternating inductive field operatively associated with cathode ray deflecting means and said cathode ray intensity control means for producing a spot on said screen at a position indicative of the position of said conductor in said body.

18. In apparatus for determining the position of a conductor supported in a body, inductive field producing means for producing an inductive field in said body in alternating inductive relation with said conductor, a cathode ray tube including a screen and a cathode ray source and cathode ray deflecting means for causing the cathode ray to scan said screen, cathode ray intensity control means including a timing device operating in synchronism with the operation of said inductive field producing means adapted to vary the intensity of said beam as a function of time, a control circuit connected to said cathode ray deflecting means and responsive to the alternating electromotive force induced in said conductor and cooperating with said cathode ray intensity control means to produce a spot on said screen at a position indicative of the position of said conductor in said body.

19. In apparatus for determining the position of a conductor supported in a body, inductive field producing means for producing an inductive field in said body in alternating inductive relation with said conductor, a cathode ray tube including a screen and a cathode ray source and cathode ray deflecting means for causing a cathode ray to scan said screen and cathode ray intensity control means, means associated with said inductive field producing means operatively associated with said cathode ray deflecting means and said cathode ray intensity control means for producing an image pattern on said screen having a dimension corresponding to the strength of said inductive field, and means controlled in accordance with the relative phase between a component of the alternating inductive field produced in said body along a predetermined line and the alternating electromotive force induced in said conductor by said alternating inductive field operatively associated with said cathode ray deflecting means and said cathode ray intensity control means for producing a spot on said screen at a point having a position relative to said image pattern indicative of the position of said conductor in said body.

20. In apparatus for determining the position of a conductor with respect to a predetermined axis of a body within which said conductor is supported, inductive field producing means for producing an inductive field in said body in alternating inductive relation with said conductor, a cathode ray tube including control means for producing an image on the screen thereof, a first control circuit associated with said inductive field producing means operatively associated with said control means for producing an image pattern on said screen having a dimension corresponding to the strength of said inductive field, and a second control circuit responsive to an alternating electromotive force induced in said conductor by said inductive field operatively associated with said control means for producing a spot on said screen at a point displaced from a reference point in said image pattern in a direction and in an amount corresponding respectively to the distance and direction of said conductor from said predetermined axis, and periodically operating switching means associated with said control circuits for selectively effectively rendering said control circuits operative.

21. In apparatus for determining the position of a conductor supported in a body, inductive field producing means for producing an inductive field in said body in alternating inductive relation with said conductor, a cathode ray tube including a screen and a cathode ray source and cathode ray deflecting means for causing the cathode ray to scan said screen, a timing device operating in synchronism with the operation of said inductive field producing means, cathode ray intensity control means controlled by said timing device whereby the intensity of said cathode ray is periodically varied as a function of time, a first control circuit operatively connectable to said cathode ray deflecting means, a second control circuit also operatively connectable to said cathode ray deflecting means, and periodically operating switching means controlled by said timing device for selectively effectively connecting said control circuits to said cathode ray deflecting means in synchronism with the operation of said inductive field producing means, said first control circuit cooperating with said inductive field producing means and with said cathode ray intensity control means to produce an image pattern on said screen having a dimension corresponding to the strength of said inductive field, said second control circuit being responsive to the alternating electromotive force induced in said conductor and cooperating with said cathode ray intensity control means to produce a spot on said screen at a point having a position thereon relative to said image pattern indicative of the position of said conductor in said body.

22. In apparatus for determining the position of a conductor supported within a body of substantially circular cross section, inductive field producing means for producing an inductive field in said body in alternating inductive relation with said conductor, a cathode ray tube including a screen and means for directing a cathode ray onto said screen and a cathode ray intensity control means and a pair of cathode ray deflecting means for respectively deflecting the cathode ray in two mutually perpendicular directions transverse thereto, means associated with said inductive field producing means operatively associated with said cathode ray deflection means for applying equal alternating deflection forces to said beam in said directions and cooperating with said cathode ray intensity control means to produce a circular image pattern on said screen having a radius corresponding to the strength of said inductive field, and means controlled in accordance with the relative phase between a component of the alternating inductive field produced in said body along a predetermined line and the alternating electromotive force induced in said conductor by said inductive field and operatively associated with said cathode ray deflecting means and cooperating with said cathode ray intensity control mens to produce a spot on said screen at a point within said circular image pattern corresponding to the position of said conductor within said body.

23. In apparatus for determining the position of a conductor supported in a body, inductive field producing means for producing a rotating inductive field in said body in alternating inductive relation with said conductor, a cathode ray tube including a screen and a cathode ray source and cathode ray deflecting means for causing a cathode ray to scan said screen, and cathode ray intensity control means, control means responsive to the alternating electromotive force induced in said conductor by said inductive field operatively associated with said cathode ray deflecting means and adapted to cause said beam to scan said screen in an image pattern of predetermined shape at a predetermined rate, said image pattern having a dimension corresponding to the magnitude of said induced alternating electromotive force, and a cathode ray intensity control circuit connected to said cathode ray intensity control means and operating synchronously with said inductive field producing means to vary the intensity of said beam as a function of time during the operation of said inductive field producing means, whereby a discrete image is produced on the screen indicative of the position of said conductor within said body.

24. In apparatus for determining the position of a conductor supported in a body, inductive field producing means for producing a rotating inductive field in said body in alternating inductive relation with said conductor, a cathode ray tube including a screen and a cathode ray source and cathode ray deflecting means for causing a cathode ray to scan said screen, and cathode ray intensity control means, first control means associated with said inductive field producing means operatively connectable to said cathode ray deflection means and adapted to cause said beam to scan said screen in a first image pattern having a dimension corresponding to the strength of said rotating inductive field, second control means responsive to the alternating electromotive force induced in said conductor by said inductive field operatively connectable to said cathode ray deflecting means and adapted to cause said beam to scan said screen in a second image pattern of predetermined shaped at a predetermined rate, said second image pattern having a dimension corresponding to the magnitude of said induced alternating electromotive force, switching means operating periodically and in synchronism with said inductive field producing means for alternately connecting said two control means to said cathode ray deflecting means, and a cathode ray intensity control circuit connected to said cathode ray intensity control means and also operating periodically and in synchronism with said inductive field producing means for varying the intensity of said beam as a function of time, whereby a discrete image is produced on the screen at a position relative to said first image pattern indicative of the position of said conductor within said body.

25. In apparatus for determining the position of a conductor supported in a body, inductive field producing means for producing a uniformly rotating inductive field in said body in alternating inductive relation with said conductor, a cathode ray tube including a screen and a cathode ray source and cathode ray deflecting means for causing the cathode ray to scan said screen and cathode ray intensity control means, control means responsive to the alternating electromotive force induced in said conductor by said inductive field operatively associated with said cathode ray deflecting means and adapted to cause said beam to scan said screen at a uniform rate on the circumference of a circle about a predetermined point on said screen, said circle having a radius corresponding to the amplitude of said induced alternating electromotive force, and a cathode ray intensity control circuit connected to said cathode ray intensity control means and operating synchronously with said inductive field producing means to vary the intensity of said beam as a function of time during the operation of said inductive field producing means, whereby a discrete image is produced on the screen at a position indicative of the position of said conductor within said body.

26. In apparatus for determining the position of a conductor supported in a body of known cross sectional outline, periodically operating inductive field producing means for producing a uniformly rotating inductive field in said body in alternating inductive relation with said conductor, a cathode ray tube including a screen and a cathode ray source and cathode ray deflecting means for causing the cathode ray to scan said screen and cathode ray intensity control means, first control means associated with said inductive field producing means operatively connectable to said cathode ray deflection means and adapted to cause said beam to scan said screen in an image pattern having the shape of said cross sectional outline and having a dimension corresponding to the strength of said rotating inductive field, second control means responsive to the alternating electromotive force induced in said conductor by said inductive field operatively connectable to said cathode ray deflecting means and adapted to cause said beam to scan said screen at a uniform rate on the circumference of a circle about a point in said image pattern corresponding to a point similarly located in said body, said circle having a radius corresponding to the amplitude of said induced alternating electromotive force, switching means operating periodically and in synchronism with said inductive field producing means operative to selectively connect said two control means to said cathode ray deflecting means in alternate periods of operation of said inductive field producing means, and a cathode ray intensity control circuit connected to said cathode ray intensity control means and also operating synchronously with said inductive field producing means to vary the intensity of said beam during said alternate periods, whereby a discrete image is produced on said screen at a position within said image pattern indicative of the position of said conductor within said body.

27. In apparatus for determining the position of a conductor supported in a body of known cross sectional outline, a cyclically operating inductive field producing means for producing a rotating inductive field in said body in alternating inductve relation with said conductor, a cathode ray tube including a screen and a cathode ray source and cathode ray deflecting means for causing the cathode ray to scan said screen, and cathode ray intensity control means, first control means associated with said inductive field producing means operatively connectable to said cathode ray deflection means and adapted to cause said beam to scan said screen in a first image pattern having the shape of said cross sectional outline and having a dimension corresponding to the strength of said rotating inductive field, second control means responsive to the altenating electromotive force induced in said conductor by said inductive field producing means operatively connectable to said cathode ray deflecting means and adapted to cause said beam to scan said screen at a predetermined rate on a path defined by a second image pattern of predetermined shape, said second image pattern having a dimension corresponding to the amplitude of said induced alternating electromotive force, switching means operating synchronously with said inductive field producing means operating to selectively connect said two control means to said cathode ray deflecting means in successive cycles of operation of said inductive field producing means, and a cathode ray intensity control circuit connected to said cathode ray intensity control means and also operating synchronously with said inductive field producing means to vary the intensity of said beam during said successive cycles of operation, whereby a discrete image is produced on the screen at a position located within said first image pattern corresponding to the position of said conductor within said body.

28. In apparatus for determining the position of a conductor supported in a body, an inductive field generator for periodically producing an inductive field in said body in alternating inductive relation with said conductor, a cathode ray tube including a cathode ray source and cathode ray deflecting means for causing a cathode ray to scan the screen thereof, cathode ray intensity control means including a timer operating in synchronism with said apparatus for periodically varying the intensity of said electron beam, and means responsive to the alternating electromotive force induced in said conductor operatively connected to said deflecting means and cooperating with said cathode ray intensity control means for producing an image on said screen at a position indicative of the position of said conductor in said body.

29. In apparatus for determining variations in the position of an inner conductor of a coaxial cable relative to the axis of the outer conductor thereof, means for producing a magnetic field which rotates relative to said cable, means for feeding said cable through said rotating magnetic field, and indicating means operatively connected between said conductors for indicating the difference between the electromotive forces induced in adjacent portions of the respective conductors by said magnetic field in the portion of said cable being fed therethrough.

30. In apparatus for testing an elongated body including a conductor extending longitudinally therein, means for producing an inductive field which rotates relative to said body about a predetermined axis, said inductive field being confined to a relatively short region along said predetermined axis, a feeding mechanism normally operative to automatically feed said elongated body through said region whereby an electromotive force is induced in said conductor by said rotating inductive field of a value corresponding to the position of the conductor in the portion of the body in said region, means for initiating operation of said feeding mechanism, and means governed by said electromotive force for arresting the operation of said feeding mechanism when said conductor occupies a position outside of a predetermined section of the portion of the body in said region.

31. In apparatus for testing a coaxial cable having mutually insulated outer and inner conductors with respect to eccentricity thereof, means for producing a magnetic field which rotates relative to said cable about a predetermined axis, said magnetic field being confined to a relatively short region along said predetermined axis, a feeding mechanism normally operative to automatically feed said cable through said region, means for initiating operation of said feeding mechanism, and means governed by the electromotive forces induced in said conductors by said rotating magnetic field for arresting the operation of said feeding mechanism when the eccentricity of the portion of the cable in said region has a value in a predetermined range.

32. In apparatus for testing an elongated body including a conductor extending longitudinally therein, means for producing an inductive field which rotates relative to said body about a predetermined axis, said inductive field being confined to a relatively short region along said predetermined axis, a circuit associated with said conductor, a feeding mechanism operative to feed said elongated body through said region, whereby an electromotive force is generated in said circuit of a value that varies in accordance with the position of the conductor in the portion of the body in said region, a control relay, means for operating said control relay, a hold device having a normal position and an operated position, means governed by said electromotive force for conditioning said hold device for operation from its normal position to its operated position as long as said conductor occupies a position in a predetermined section of the portion of the body in said region, means controlled by the operation of said control relay for operating said feeding mechanism, means also controlled by the operation of said control relay for operating said hold device from its normal position to its operated position when so conditioned whereby said control relay remains in its operated position as long as said hold device remains operated, means governed by said electromotive force for restoring said hold device from its operated position to its normal position when a portion of the body having said conductor in a position outside of said predetermined section is disposed in said region, and independently operable means for restoring said hold device from its operated position to its normal position regardless of the position of said conductor in the section of said body in said region.

33. In apparatus for testing a coaxial cable having mutually insulated outer and inner conductors, means for producing a magnetic field which rotates relative to said cable about a predetermined axis, said magnetic field being confined to a relatively short region along said predetermined axis, a circuit associated with said conductor, a feeding mechanism operative to feed said elongated body through said region, whereby an electromotive force is generated in said circuit of a value that varies in accordance with eccentricity of the portion of the cable in said region, a control relay, means for operating said relay, a hold device having a normal position and an operated position, means governed by said electromotive force for conditioning said hold device for operation from its normal position to its operated position as long as the eccentricity of the portion of the body in said region has a value in a predetermined range, means controlled by the operation of said control relay for operating said feeding mechanism, means controlled by the operation of said control relay for operating said hold device from its normal position to its operated position when so conditioned whereby said control relay remains in its operated position as long as said hold device remains operated, means governed by said electromotive force for restoring said hold device from its operated position to its normal position when a portion of the cable having an eccentricity outside of said predetermined range is disposed in said region, and independently operable means for restoring said hold device from its operated position to its normal position regardless of the eccentricity of the portion of the cable in said region.

34. A magnetic testing device comprising a magnetic structure including a plurality of magnetic pole members defining a test region and a yoke member defining a magnetic circuit having a magnetic flux path enclosing the test region and interconnecting said poles, said yoke member including means adapted to provide a gap in said magnetic circuit adapted to provide access to said test region across said magnetic flux path, whereby an object to be tested may be introduced into said test region across said magnetic flux path, and means associated with said magnetic structure for producing a rotating magnetic field in said test region.

35. A testing device comprising a magnetic structure including two relatively movable members having an open position and a closed position, said structure when in the closed position defining a magnetic circuit having a magnetic flux path enclosing a test region and said structure when in the open position providing access to said test region, whereby an object to be tested may be introduced into said test region across the magnetic flux path, and means associated with said magnetic structure for producing a rotating magnetic field in said test region.

36. In a method of testing a body including a conductor, the steps which comprise establishing an inductive field which rotates about a reference axis in said body, the angular position of said inductive field changing periodically relative to a fixed reference line normal to said reference axis, whereby an alternating electromotive force is induced in said conductor, and measuring the difference between the time phase of the alternating electromotive force induced in said conductor by said rotating inductive field and the time phase of the angular position of said rotating inductive field to determine the angular position of said conductor in said body.

37. In a method of testing a cable including a pair of conductors, the steps which comprise establishing an inductive field through said cable which rotates about a reference axis substantially parallel to the axis of said cable, the angular position of said inductive field changing periodically relative to a reference line normal to said reference axis, whereby alternating electromotive forces are induced in said conductors, producing a resultant alternating electromotive force equal to the difference between said induced alternating electromotive forces, and measuring the difference between the time phase of said resultant alternating electromotive force and the time phase of the angular position of said rotating inductive field to determine the relative angular position of said conductors in said cable.

38. In a method of testing a coaxial cable including an inner conductor disposed within an outer conductor and insulatingly spaced therefrom, the steps which comprise establishing a magnetic field through said cable which rotates about a reference axis substantially parallel to the axis of the outer conductor, the angular position of said inductive field changing periodically relative to a reference line normal to said reference axis whereby inducing alternating electromotive forces are induced in said conductors, producing a resultant alternating electromotive force equal to the difference between said induced alternating electromotive forces, and measuring the difference between the time phase of said resultant alternating electromotive force and the time phase of the angular position of the rotating magnetic field to determine the angular position of said inner conductor with respect to the axis of said outer conductor.

39. In a method of testing a body including an inner conductor disposed within and insulated from an outer conductor, the steps which comprise establishing a rotating inductive field through said body and transversely of the axis of said outer conductor, thereby inducing an alternating electromotive force in said conductor, and measuring the amplitude of the alternating electromotive force induced in said inner conductor by said rotating inductive field to determine the displacement of said inner conductor from the axis of said outer conductor.

40. In a method of testing a coaxial cable including an inner conductor disposed within an outer conductor and insulatingly spaced therefrom, the steps which comprise establishing a rotating magnetic field through said cable and transversely of the cable axis, thereby inducing alternating electromotive force in said conductors, and measuring the difference between the alternating electromotive forces induced in said conductors to determine the displacement of said inner conductor from the axis of said outer conductor.

41. In a method of testing a body including a conductor, the steps which comprise establishing an inductive field which rotates about a reference axis in said body, the angular position of said inductive field changing periodically relative to a fixed reference line normal to said reference axis, whereby alternating electromotive force is induced in said conductor, measuring the difference between the time phase of the alternating electromotive force induced in said conductor by said rotating inductive field and the time phase of the angular position of said rotating inductive field, and measuring the amplitude of the alternating electromotive force induced in said conductor by said inductive field whereby the position of said conductor with respect to said reference axis is determined.

42. In a method of testing a coaxial cable including an inner conductor disposed within an outer conductor and insulatingly spaced therefrom, the steps which comprise establishing a magnetic field through said cable which rotates about an axis substantially parallel to said cable, the angular position of said magnetic field changing periodically relative to a reference line normal to said reference axis whereby alternating electromotive forces are induced in said conductors, producing a resultant alternating electromotive force equal to the difference between said induced alternating electromotive forces, and measuring both the amplitude of said resultant electromotive force and the difference between the time phase of said resultant alternating electromotive force and the time phase of the angular position of said inductive field to determine the relative position of said conductors.

43. In a method of testing a cable including a plurality of mutually insulated conductors, the steps which comprise establishing a rotating inductive field in a predetermined region, successively positioning a series of sections of said cable in said region, thereby successively subjecting adjacent sections of the respective conductors in the respective sections of the cable to the influence of said rotating inductive field whereby a corresponding series of alternating electromotive forces is induced in each of the conductors, producing a corresponding series of resultant alternating electromotive forces each of which equals the difference between corresponding alternating electromotive forces successively induced in the respective conductors when the corresponding section of the cable is positioned in said region, and indicating the relative position of the conductors in said cable as a function of said resultant electromotive forces.

44. In a method of testing a coaxial cable including an inner conductor disposed within an outer conductor and insulatingly spaced therefrom, the steps which comprise establishing a rotating magnetic field in a predetermined region, successively positioning a series of sections of said cable in said region, thereby successively subjecting adjacent sections of the respective conductors in the respective sections of the cable to the influence of said rotating magnetic field whereby a corresponding series of alternating electromotive forces is induced in each of the conductors, producing a corresponding series of resultant alternating electromotive forces each of which equals the difference between corresponding alternating electromotive forces induced along the respective conductors when the corresponding section of the cable is positioned in said region, and electrically comparing said resultant electromotive forces to a standard to determine differences in the eccentricity of said conductors in the respective sections of the cable.

JAMES D. GOW.

REFERENCES CITED

The following references are of record in the file of this patent:

UNITED STATES PATENTS

| Number | Name | Date |
|---|---|---|
| Re. 21,853 | Atkinson | July 15, 1941 |
| 1,599,645 | Burrows | Sept. 14, 1926 |
| 2,111,210 | Ebel | Mar. 15, 1938 |
| 2,135,675 | Palmer | Nov. 8, 1938 |
| 2,186,826 | Edgar | Jan. 9, 1940 |
| 2,274,735 | Peters et al. | Mar. 3, 1942 |
| 2,441,380 | Zuschlag | May 11, 1948 |
| 2,467,306 | Habig | Apr. 12, 1949 |
| 2,471,417 | Dimmick et al. | May 31, 1949 |